US008709660B2

United States Patent
Takamura et al.

(10) Patent No.: US 8,709,660 B2
(45) Date of Patent: Apr. 29, 2014

(54) NON-AQUEOUS ELECTROLYTE BATTERY

(75) Inventors: Koshi Takamura, Osaka (JP); Yasuhiko Bito, Osaka (JP)

(73) Assignee: Panasonic Corporation, Osaka (JP)

( * ) Notice: Subject to any disclaimer, the term of this patent is extended or adjusted under 35 U.S.C. 154(b) by 581 days.

(21) Appl. No.: 12/676,768

(22) PCT Filed: Sep. 2, 2008

(86) PCT No.: PCT/JP2008/002400
§ 371 (c)(1),
(2), (4) Date: Mar. 5, 2010

(87) PCT Pub. No.: WO2009/031293
PCT Pub. Date: Mar. 12, 2009

(65) Prior Publication Data
US 2010/0203390 A1  Aug. 12, 2010

(30) Foreign Application Priority Data

| Sep. 6, 2007 | (JP) | 2007-231431 |
| Sep. 6, 2007 | (JP) | 2007-231432 |
| Nov. 26, 2007 | (JP) | 2007-304695 |
| Sep. 1, 2008 | (JP) | 2008-223441 |

(51) Int. Cl.
*H01M 4/13* (2010.01)
*H01M 4/58* (2010.01)

(52) U.S. Cl.
USPC ..................................... 429/231.8

(58) Field of Classification Search
USPC .............................. 429/231.8, 209, 217, 231.7
See application file for complete search history.

(56) References Cited

U.S. PATENT DOCUMENTS

| 2002/0061437 A1 | 5/2002 | Gan et al. |
| 2005/0227146 A1 | 10/2005 | Ghantous et al. |
| 2007/0231696 A1* | 10/2007 | Yazami et al. ............. 429/231.7 |
| 2008/0176142 A1* | 7/2008 | Inagaki et al. ............... 429/330 |
| 2009/0111021 A1* | 4/2009 | Yazami et al. ............... 429/209 |
| 2009/0258294 A1* | 10/2009 | Yazami et al. ............... 429/217 |

FOREIGN PATENT DOCUMENTS

| EP | 1 890 348 A1 | 2/2008 |
| JP | 58-005966 | 1/1983 |
| JP | 58-026457 | 2/1983 |
| JP | 09-180721 | 7/1997 |
| JP | 2002-203607 | 7/2002 |

(Continued)

OTHER PUBLICATIONS

Tsuyoshi Nakajima, Electrochemical behavior of plasma-fluorinated graphite for lithium ion batteries, Journal of Power Sources 104 (2002) 108-114.*

(Continued)

*Primary Examiner* — Jie Yang
*Assistant Examiner* — Jenny Wu
(74) *Attorney, Agent, or Firm* — McDermott Will & Emery LLP

(57) ABSTRACT

A non-aqueous electrolyte battery including a negative electrode including metal lithium or a lithium alloy as a negative electrode active material, a positive electrode including a fluorinated graphite as a positive electrode active material, a separator provided between the positive electrode and the negative electrode, and a non-aqueous electrolyte. The concentration ratio [F]/[C] of fluorine atoms to carbon atoms on the surface of the fluorinated graphite is 1.0 or more and less than 1.8. This improves the large-current discharge characteristics particularly in a low temperature environment.

13 Claims, 2 Drawing Sheets

(56) References Cited

FOREIGN PATENT DOCUMENTS

| | | |
|---|---|---|
| JP | 2005-247679 | 9/2005 |
| JP | 2006-059732 | 3/2006 |
| JP | 2006-236888 | 9/2006 |
| JP | 2006-236891 | 9/2006 |
| JP | 2007-087688 | 4/2007 |
| JP | 2007087688 A * | 4/2007 |
| WO | WO 2006/129756 A1 | 12/2006 |
| WO | WO 2006129756 A1 * | 12/2006 |

OTHER PUBLICATIONS

N. Kumagai et al., "Effect on discharge of the heat treatment of graphite fluoride under a hydrogen atmosphere," Journal of Applied Electrochemistry, vol. 25 (1995) pp. 869-873.

* cited by examiner

NON-AQUEOUS ELECTROLYTE BATTERY

RELATED APPLICATIONS

This application is the U.S. National Phase under 35 U.S.C. §371 of International Application No. PCT/JP2008/002400, filed on Sep. 2, 2008, which in turn claims the benefit of Japanese Application Nos. 2007-231431, filed on Sep. 6, 2007, 2007-231432, filed Sep. 6, 2007, 2007-304695, filed Nov. 26, 2007, and 2008-223441, filed Sep. 1, 2008, the disclosures of which Applications are incorporated by reference herein.

TECHNICAL FIELD

The present invention relates to a non-aqueous electrolyte battery including fluorinated graphite as a positive electrode active material, and particularly relates to an improvement of the surface condition of the fluorinated graphite and an improvement of the large-current pulse discharge characteristics of the non-aqueous electrolyte battery.

BACKGROUND ART

Non-aqueous electrolyte batteries, particularly lithium primary batteries, have been used as power sources for electronic equipment such as portable devices. Such electronic equipment is designed to be used in an environment having a temperature ranging from about −20° C. to 60° C. on the basis of the human living environment.

However, in recent years, the equipment using batteries has been applied in a wider range, and in association with this, the range of the operating temperature of such equipment tends to be widened. For example, primary batteries that can keep functioning for a certain period of time even when the operating environment temperature is supposed to be 125° C. at maximum and can operate at a temperature as low as about −40° C. have been required as batteries to be used in vehicle-mounted apparatus.

Typical lithium primary batteries include CR batteries in which manganese dioxide is used as a positive electrode active material and BR batteries in which fluorinated graphite is used as a positive electrode active material.

In general, CR batteries are excellent in load characteristics at low temperature but are insufficient in high-temperature characteristics. Specifically, at a high temperature of 60° C. or higher, the non-aqueous electrolyte is decomposed by catalysis of manganese dioxide in the presence of a very small amount of water in the battery, causing gas to be generated. As a result, the battery swells and the bonding tightness in the interior of the battery is reduced, which may greatly increase the internal resistance in the battery.

On the other hand, BR batteries are excellent in high-temperature characteristics because the reactivity between materials such as the reaction between the fluorinated graphite and the non-aqueous electrolyte is low even at a high temperature of 100° C. or higher, and the increase in internal resistance in the battery is small. For this reason, at a high temperature of 100° C. or higher, BR batteries are more reliable than CR batteries.

The fluorinated graphite that is currently used as a positive electrode active material for a lithium primary battery is fluorinated graphite having a high content of fluorine, since such fluorinated graphite has a high capacity and is excellent in the flatness of the discharge voltage. BR batteries using such fluorinated graphite are very excellent in high-temperature characteristics, but are insufficient in discharge characteristics at low temperature, and thus, for example, the discharge rate characteristics may be deteriorated.

Moreover, in the case of using fluorinated graphite, the voltage drops sharply at the beginning of discharge and then shows a slight increase, which is followed by an almost constant voltage, and then the voltage is stabilized. Such a sharp drop in voltage causes no problem in the case of a discharge at a very weak current, for example, in the case of being used as a memory backup power source, since the drop in battery voltage is small. However, in the case of being used in equipment for transmitting electric waves such as a tire pressure sensor of vehicle-mounted apparatus, since the operating current is large, the drop in voltage, particularly the drop in voltage at the beginning of discharge may be increased.

Further, in the future, if the equipment is miniaturized, the size of batteries would need to be reduced following the miniaturization of the equipment. The reduction in size of batteries involves a reduction of the reaction area in electrodes and an increase of the current density of discharge, and as a result, the discharge voltage is further reduced.

In order to improve the discharge characteristics at low temperature, for example, one proposal suggests forming a hydrophilic functional group on the surface of fluorinated graphite by a method selected from ozone treatment, plasma treatment, corona treatment, and ultraviolet irradiation treatment (see Patent Literature 1). According to this proposal, the hydroxyl group or carboxyl group formed on the surface of the fluorinated graphite ameliorates the wettability of the positive electrode with non-aqueous electrolyte, and thus ameliorates the low-temperature discharge characteristics at −20° C.

Patent Literature 2 discloses a method of irradiating fluorinated graphite with γ-rays in order to prevent an appearance of a minimum voltage point at the beginning of discharge and to reduce the drop in voltage at the beginning of discharge. The irradiation partially dissociates the C—F bond on the fluorinated graphite surface, forming a carbon layer on the surface.

Patent Literature 3 discloses a method of irradiating fluorinated graphite with ultraviolet rays while the fluorinated graphite is impregnated in or wetted with an organic solvent. According to this method, the fluorinated graphite surface is partially defluorinated, and a carbon layer is formed on the surface.

Non-Patent Literature 1 discloses a method of heating fluorinated graphite at 300 to 450° C. in a hydrogen gas atmosphere to dissociate the C—F bond on the fluorinated graphite surface, and thus forming a carbon layer on the surface.

In Patent Literatures 2 and 3 and Non-Patent Literature 1, a carbon layer is formed on the fluorinated graphite surface to impart conductivity to the fluorinated graphite. This can prevent the appearance of a minimum voltage point at the beginning of discharge.

In order to ameliorate the discharge rate characteristics, Patent Literature 4 suggests using fluorinated graphite having a particle size of submicron order. Patent Literature 4 discloses that, by using a powder of fluorinated graphite having an average particle size of 1 μm or less, the surface area of the fluorinated graphite is increased, and the occurrence of the reaction through which the fluorinated graphite absorbs lithium is allowed to increase, and as a result, the discharge characteristics are ameliorated.

Patent Literature 1: Japanese Laid-Open Patent Publication No. 2006-59732

Patent Literature 2: Japanese Laid-Open Patent Publication No. Sho 58-5966

Patent Literature 3: Japanese Laid-Open Patent Publication No. Sho 58-26457
Patent Literature 4: Japanese Laid-Open Patent Publication No. 2005-247679
Non-Patent Literature 1: N. Kumagai, et. al., J. Applied Electrochem., vol. 20 (1995), page 869-873

SUMMARY OF INVENTION

Technical Problem

However, the invention according to Patent Literature 1 fails to provide a sufficient amelioration effect with regard to the large-current discharge characteristics in an environment having a temperature as low as −40° C. The viscosity of non-aqueous electrolyte increases exponentially as the temperature decreases, and therefore, is significantly high at −40° C. Even when a hydrophilic functional group is formed on the surface of the fluorinated graphite, the wettability of the positive electrode with non-aqueous electrolyte is not sufficiently ameliorated at −40° C., causing the battery voltage to drop considerably in a large-current discharge.

The methods disclosed in Patent Literatures 2 and 3 and Non-Patent Literature 1 would improve the voltage at the beginning of discharge. In these methods, however, since the C—F bond on the fluorinated graphite surface is dissociated, the degree of fluorination of the fluorinated graphite as a whole is decreased, causing the discharge capacity of the battery to decrease.

Further, in the fluorinated graphite prepared by the method disclosed in Patent Literature 4, fluorine is easily liberated and tends to be more easily liberated in a high temperature environment. The liberated fluorine forms an electrically insulating coating film on the negative electrode, and therefore, the high-temperature storage characteristics may be significantly deteriorated. Moreover, the powder of fluorinated graphite having an average particle diameter of submicron order is low in bulk density and thus low in compression packability, and therefore, the packing amount of the active material is reduced, resulting in a decreased battery capacity.

The present invention intends to provide a non-aqueous electrolyte battery excellent in discharge characteristics, particularly in large-current pulse discharge characteristics in a low temperature environment, without sacrificing the high-temperature storage characteristics.

Further, the present invention intends to reduce the drop in voltage at the beginning of discharge of the fluorinated graphite, without sacrificing the discharge capacity.

Solution to Problem

The present invention provides a non-aqueous electrolyte battery including:

a positive electrode including a positive electrode active material, the positive electrode active material containing a first fluorinated graphite having a concentration ratio [F]/[C] of fluorine atoms to carbon atoms on the surface of the first fluorinated graphite of 1.0 or more and less than 1.8;

a negative electrode including a negative electrode active material, the negative electrode active material containing metal lithium or a lithium alloy;

a separator disposed between the positive electrode and the negative electrode; and a non-aqueous electrolyte.

In the present invention, the ratio of fluorine atoms present on the surface of the first fluorinated graphite is decreased and the ratio of carbon atoms is increased. By decreasing the ratio of fluorine atoms excellent in hydrophobicity and oil-repellency, the wettability of the positive electrode with non-aqueous electrolyte can be further improved. Further, the ratio of carbon atoms present on the surface of the first fluorinated graphite can be increased, and thus the conductivity of the fluorinated graphite surface can be further improved. As such, the large-current discharge characteristics in a low temperature environment can be ameliorated.

It is preferable that the first fluorinated graphite has a C1s peak attributed to a C—F bond in the region of 290 eV or less and has an F1s peak attributed to a C—F bond in the region of 688.5 eV or less in X-ray photoelectron spectroscopy (XPS).

In the present invention, while the C—F binding energy on the surface of the fluorinated graphite is set lower than that in the state of a perfect covalent bond, the decrease of the degree of fluorination as a whole is suppressed. As such, it is possible at the same time to prevent the appearance of a minimum voltage point at the beginning of discharge and the decrease of the discharge capacity of the battery.

In the fluorinated graphite according to the present invention, the C—F binding energy on the surface thereof is lower than the binding energy of the conventional fluorinated graphite. Specifically, the C—F bond is easily dissociated on the surface of the fluorinated graphite according to the present invention. This allows an intermediate product of the reaction among carbon, fluorine and lithium to be easily formed at the beginning of discharge, reducing the overvoltage at the positive electrode at the beginning of discharge.

It is preferable that the positive electrode active material further contains a second fluorinated graphite having a concentration ratio [F]/[C] of fluorine atoms to carbon atoms on the surface thereof of more than 1.8, and the first fluorinated graphite and the second fluorinated graphite are present in a mixed state.

It is preferable that the first fluorinated graphite is obtained by pulverizing the second fluorinated graphite having a concentration ratio [F]/[C] of fluorine atoms to carbon atoms on the surface thereof of more than 1.8. The pulverizing allows an unfluorinated carbon portion present in the interior of the fluorinated graphite to be exposed on the surface. This decreases the ratio of the fluorine atoms present on the surface of the fluorinated graphite, and can ameliorate the wettability of the fluorinated graphite with non-aqueous electrolyte. Consequently, the large-current discharge characteristics in a low temperature environment can be ameliorated.

It is preferable that the second fluorinated graphite has a C1s peak attributed to a C—F bond in the region of more than 290 eV and has an F1s peak attributed to a C—F bond in the region of more than 688.5 eV in X-ray photoelectron spectroscopy.

It is preferable that the first fluorinated graphite has a total pore volume of 0.05 $cm^3$/g or more and 1.0 $cm^3$/g or less. By increasing the pores in the interior of the fluorinated graphite, the gaps between crystallites in the crystal structure thereof are increased, facilitating the ion diffusion in the interior of the fluorinated graphite. Consequently, the low-temperature discharge characteristics can be further ameliorated.

It is preferable that the first fluorinated graphite has a particle diameter $D_{50}$ at a volume fraction of 50% in a volume-accumulated particle size distribution of 0.1 to 10 μm. By setting the particle size within this range, the specific surface area of the fluorinated graphite is increased, and the reaction area in the positive electrode active material is increased, and therefore, the interface resistance can be reduced. Consequently, the low-temperature discharge characteristics can be further ameliorated.

It is preferable that the first fluorinated graphite is represented by the formula (1): $(CF_x)_n$, where $0.4 \leq x \leq 1.15$, and n is an integer of 1 or more.

Using such fluorinated graphite can increase the effect of ameliorating the low-temperature discharge characteristics and the effect of improving the discharge capacity.

It is more preferable that the C1s peak attributed to a C—F bond is in the region of 288 to 290 eV, and the F1s peak attributed to a C—F bond is in the region of 686.5 to 688.5 eV. In such fluorinated graphite, since the C—F bond has a suitable degree of strength, the C—F bond is easily dissociated during the reaction with lithium, and fluorine is unlikely to be liberated from the surface of the fluorinated graphite. Consequently, a non-aqueous electrolyte battery excellent in discharge characteristics and high-temperature storage characteristics can be obtained.

It is preferable that the first fluorinated graphite further has an O1s peak attributed to a C—O bond in the region of 530 to 534 eV in X-ray photoelectron spectroscopy.

It is more preferable that the first fluorinated graphite has a particle diameter $D_{50}$ at a volume fraction of 50% in a volume-accumulated particle size distribution of 0.2 μm or more and 7 μm or less.

It is more preferable that the second fluorinated graphite has a particle diameter $D_{50}$ at a volume fraction of 50% in a volume-accumulated particle size distribution of 10 μm or more and 30 μm or less.

It is preferable that the mixing ratio of the first fluorinated graphite to the second fluorinated graphite in the positive electrode is 10:90 to 90:10 by weight.

It is preferable that the first fluorinated graphite has a higher potential than the second fluorinated graphite.

Advantageous Effects of Invention

According to the present invention, the wettability of the fluorinated graphite with non-aqueous electrolyte in an environment having a temperature as low as −40° C. can be improved, and the conductivity of the surface of the fluorinated graphite can also be improved. Therefore, a non-aqueous electrolyte battery excellent in large-current discharge characteristics in a low temperature environment can be obtained.

According to the present invention, a non-aqueous electrolyte battery excellent in discharge characteristics, particularly in large-current pulse discharge characteristics in a low temperature environment can be obtained without sacrificing the high-temperature storage characteristics.

According to the present invention, the drop in voltage at the beginning of discharge of the fluorinated graphite can be reduced without sacrificing the discharge capacity.

DESCRIPTION OF EMBODIMENTS

An embodiment for carrying out the present invention is described below.

Figure 1:
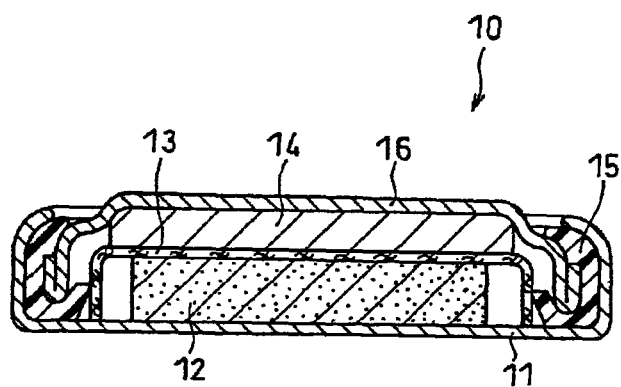
FIG. 1 A longitudinal cross-sectional view schematically showing a non-aqueous electrolyte battery according to one embodiment of the present invention.

FIG. 1 shows a longitudinal cross-sectional view schematically showing a non-aqueous electrolyte battery according to one embodiment of the present invention. A battery 10 includes a positive electrode 12, a negative electrode 14, a separator 13 disposed between the positive electrode and the negative electrode, a non-aqueous electrolyte (not shown), a battery case 11 accommodating these, and a sealing plate 16 with an insulator gasket 15 provided on the periphery thereof.

The positive electrode 12 contains a first fluorinated graphite as a positive electrode active material. The concentration ratio [F]/[C] of fluorine atoms to carbon atoms on the surface of the first fluorinated graphite (hereinafter also referred to as the "degree of surface fluorination") is controlled to be 1.0 or more and less than 1.8. When the degree of surface fluorination of the fluorinated graphite is within this range, the ratio of fluorine atoms excellent in hydrophobicity and oil-repellency that are present on the surface of the fluorinated graphite particle is small, and therefore, the wettability of the positive electrode with non-aqueous electrolyte can be increased. Accordingly, the overvoltage during discharge can be reduced particularly even in a low temperature environment. Further, since the ratio of carbon atoms present on the surface becomes large, the conductivity of the surface of the fluorinated graphite can be further improved. Consequently, the large-current discharge characteristics in a low temperature environment, particularly the large-current pulse discharge characteristics can be ameliorated.

When the degree of surface fluorination of the fluorinated graphite is more than 1.8, the ratio of functional groups having a large content of fluorine atom is high, and therefore, the wettability of the first fluorinated graphite with non-aqueous electrolyte is poor. On the other hand, when the degree of surface fluorination is less than 1.0, the fluorine atom content in the first fluorinated graphite itself is small, failing to provide a sufficient discharge capacity. More preferably, the degree of surface fluorination is within the range of 1.1 to 1.7, and the upper limit of this range is more preferably 1.6 and is particularly preferably 1.5.

The first fluorinated graphite preferably has a C1s peak attributed to a C—F bond in the region of 290 eV or less and has an F1s peak attributed to a C—F bond in the region of 688.5 eV or less in X-ray photoelectron spectroscopy (XPS). Such fluorinated graphite has on the surface thereof a C—F bond that is not a perfect covalent bond. For this reason, the C—F bond is easily dissociated, facilitating the reaction between carbon-fluorine and lithium. Consequently, the overvoltage at the beginning of discharge can be reduced, and the drop in voltage at the beginning of discharge can be suppressed.

In particular, in view of suppressing the liberation of fluorine from the surface of the fluorinated graphite, it is preferable that the C1s peak attributed to a C—F bond in the first fluorinated graphite is in the region of 288 to 290 eV, and the F1s peak attributed to a C—F bond therein is in the region of 686.5 to 688.5 eV. This makes it possible to achieve both excellent discharge characteristics and excellent high-temperature storage characteristics.

It is preferable that the first fluorinated graphite further has an O1s peak attributed to a C—O bond in the region of 530 to 534 eV in X-ray photoelectron spectroscopy. The presence of a C—O bond improves the wettability of the fluorinated graphite with non-aqueous electrolyte. The C—O bond may be a single bond or a multiple bond. Fluorinated graphite usually does not have an O1s peak attributed to a C—O bond. Although the reason why the first fluorinated graphite of the present invention has an O1s peak attributed to a C—O bond is not clear in detail, it is presumable that unstable carbon located on the edge plane in the crystal structure of the fluorinated graphite has bonded to oxygen in air.

The degree of surface fluorination of the fluorinated graphite can be measured by, for example, X-ray photoelectron spectroscopy. Specifically, a wide-scan spectrum of a fluorinated graphite sample containing an internal standard (e.g., gold) is measured, and on the basis of the wide-scan spectrum, narrow-scan spectra for certain peaks (e.g., C1s and F1s) are measured. After the area of each predetermined peak is determined, the concentration of carbon atoms and the concentration of fluorine atoms are calculated from the area. Further, the foregoing internal standard can be used to perform electrostatic charge correction.

The XPS measurement of the fluorinated graphite may be performed, for example, in the following manner.

For a measurement sample for XPS, for example, a sample powder (fluorinated graphite) partially coated with gold is used.

The wide-scan spectrum and the narrow-scan spectra of the measurement sample can be measured, for example, with XPS-7000 available from Rigaku Corporation by using Mg—Kα rays as a radiation source. The measurement conditions for the wide-scan spectrum are, for example, 5 kV and 5 mA; and the measurement conditions for the narrow-scan spectra are, for example, 10 kV and 10 mA. The electrostatic charge correction is performed, for example, by using the position of an Au4f peak of the gold that is vapor-deposited on the sample, as a reference. In the C1s spectrum of the fluorinated graphite, two peaks attributed to a C—F bond and a carbon component are observed. Here, when the position of the peak attributed to a carbon component is not at 284.2 eV, the correction may be performed on the assumption that the position of the peak attributed to a carbon component is at 284.2 eV.

The first fluorinated graphite is preferably represented by the formula (1): $(CF_x)_n$, where $0.4 \leq x \leq 1.15$, and n is an integer of 1 or more. By using the fluorinated graphite represented by the foregoing formula, the low-temperature discharge characteristics can be further improved. In addition, the high-temperature storage characteristics can be further ameliorated, and the discharge capacity can be further increased. When the value x in the formula (1), namely, the degree of fluorination, exceeds 1.15, the effect of reducing the overvoltage is abated since the content of fluorine is high, and therefore, sufficient discharge characteristics may not be obtained. When the degree of fluorination is less than 0.4, a sufficient energy density may not be obtained since the discharge capacity per weight of the fluorinated graphite is small. In the first fluorinated graphite of the formula (1), more preferably $0.5 \leq x \leq 1.15$, and further preferably $0.9 \leq x \leq 1.1$.

Here, for example, the value x in the fluorinated graphite $(CF_x)_n$ is a ratio of the number of moles of fluorine atoms to the number of moles of carbon atoms contained in the fluorinated graphite.

The particle diameter $D_{50}$ of the first fluorinated graphite when the volume fraction in a volume-accumulated particle size distribution is 50% is preferably 0.1 to 10 μm, more preferably 0.1 to 7 μm, and further preferably 0.2 to 3 μm. When the particle diameter $D_{50}$ of the first fluorinated graphite is within the foregoing ranges, the surface area of the first fluorinated graphite is large. This can reduce the interface resistance of the positive electrode active material, and therefore, the low-temperature discharge characteristics can be ameliorated. The volume-accumulated particle size distribution can be measured, for example, using a laser diffraction particle size distribution meter.

When the particle diameter $D_{50}$ is less than 0.1 μm, a large amount of binder must be used in producing a positive electrode in the form of a pellet. Using an electrode produced using a large amount of binder may deteriorate the discharge characteristics. Moreover, the amount of fluorine to be liberated from the fluorinated graphite is increased since the specific surface area is too large, and therefore, the increase in internal resistance during storage may become large. When the particle diameter $D_{50}$ is more than 10 μm, an effect of ameliorating the low-temperature discharge characteristics may not be sufficiently obtained since the surface area of the first fluorinated graphite is small.

The first fluorinated graphite has pores, and the total pore volume thereof is preferably 0.05 to 1.0 cm³/g. By increasing the pores in the interior of the first fluorinated graphite, the gaps between crystallites in the crystal structure thereof are increased. This facilitates the ion diffusion in the interior of the first fluorinated graphite, and thus can improve the low-temperature pulse discharge characteristics.

When the total pore volume thereof is less than 0.05 cm³/g, gaps between crystallites in the crystal structure thereof are insufficient, and therefore, the effect of improving the low-temperature pulse discharge characteristics may not be sufficiently obtained. When the total pore volume thereof is more than 1.0 cm³/g, the first fluorinated graphite may absorb the non-aqueous electrolyte and swell greatly. In a positive electrode in the form of a pellet, a swelling of the positive electrode active material may break the electrically conductive network in the positive electrode, resulting in a deterioration of the discharge characteristics.

The total pore volume can be measured by, for example, a BET method (nitrogen adsorption method).

The positive electrode active material may contain the first fluorinated graphite and a second fluorinated graphite having a concentration ratio [F]/[C] of fluorine atoms to carbon atoms on the surface thereof of more than 1.8. In this case, the first fluorinated graphite and the second fluorinated graphite are present preferably in a mixed state.

In the case where the second fluorinated graphite is used, lithium is considered to react with the C—F bonds with weak binding strength that are present on the surface of the fluorinated graphite. As the discharge further proceeds, the voltage gradually drops until reaching the minimum point, after which the voltage recovers and shows a flat voltage profile. The reason why the minimum point of the discharge voltage appears is considered as follows: as the discharge proceeds, the conductivity of the second fluorinated graphite that has absorbed lithium is improved, and the reactivity of the second fluorinated graphite with lithium is improved, reducing the overvoltage.

In the case where the second fluorinated graphite is used alone, the voltage drops sharply at the beginning of discharge and then shows a slight increase to form the minimum point, after which the discharge voltage shows an almost constant flat profile. In the case of using a positive electrode active material in which the first fluorinated graphite and the second fluorinated graphite are present in a mixed state, for example, when a pulse discharge is performed at a large current, the first fluorinated graphite having a high reactivity with lithium reacts preferentially with lithium immediately after the start of discharge, exhibiting a closed circuit voltage during pulse discharge (hereinafter referred to as a "pulse CCV") equivalent to that in the case where the first fluorinated graphite is used alone as the active material. While the first fluorinated graphite is reacting preferentially with lithium and exhibiting a high pulse CCV, the second fluorinated graphite reacts gradually with lithium, increasing the conductivity of the fluorinated graphite gradually. For this reason, in a battery including a positive electrode active material in which the first fluorinated graphite and the second fluorinated graphite are present in a mixed state, a severe drop in voltage, as occurs in a battery including the second fluorinated graphite alone as the active material, will not occur at the beginning of discharge, and the pulse CCV can be maintained high even at the beginning of discharge.

The second fluorinated graphite also serves as a raw material (a precursor) of the first fluorinated graphite. The second fluorinated graphite is prepared by fluorination of a starting material such as a carbon material. The fluorination is performed by, for example, allowing a starting material to react with fluorine gas at a temperature of about 250 to 650° C. Subsequently, the degree of surface fluorination of the second fluorinated graphite thus prepared is adjusted to 1.0 or more and less than 1.8, to give the first fluorinated graphite.

The starting material of the second fluorinated graphite may be a carbon material having a graphite structure in at least a part thereof. Examples of such a carbon material include natural graphite, artificial graphite, petroleum coke, thermal black, acetylene black, furnace black, vapor growth carbon fiber, pyrolytic carbon, mesophase microbeads, coal coke, petroleum-based carbon fiber, coal-based carbon fiber, charcoal, activated carbon, glassy carbon, rayon-based carbon fiber, PAN-based carbon fiber, carbon nanotube, and fullerene.

The second fluorinated graphite is prepared by fluorination of such a carbon material.

The starting material is not limited to the above-listed materials, and may be any material as long as the material after fluorination (i.e., the second fluorinated graphite) has at least a graphite structure. Further, the starting material may be subjected to graphitization so that the degree of graphitization thereof is increased, and then subjected to fluorination.

The degree of surface fluorination of the resultant second fluorinated graphite is usually within the range of more than 1.8 and less than 2.5. The formation of the second fluorinated graphite starts from the fluorination of the surface of the starting material, followed by the fluorination of the interior thereof. Due to the influence of such a reaction mechanism, a functional group having a high content of fluorine, such as a carbon-fluorine bond, a difluoromethylene group ($-CF_2-$), or a trifluoromethyl group ($-CF_3$) is present in the vicinity of the surface of the second fluorinated graphite. Accordingly, more fluorine atoms are present than carbon atoms on the surface of the second fluorinated graphite.

For the reason as described above, the surface of the second fluorinated graphite usually has a C1s peak attributed to a C—F bond in the region of more than 290 eV and has an F1s peak attributed to a C—F bond in the region of more than 688.5 eV. In such a surface, the C—F bond is not easily dissociated, and the reaction of C—F with lithium is unlikely to occur. Further, such a surface of the second fluorinated graphite as described above where many of the C—F bonds are present in the form of a covalent bond is excellent in electrical insulation and, therefore, is unlikely to react with lithium. Accordingly, in the case where the second fluorinated graphite is used as the active material, the overvoltage immediately after the start of discharge is increased.

The second fluorinated graphite having a C1s peak attributed to a C—F bond in the region of more than 290 eV and has an F1s peak attributed to a C—F bond in the region of more than 688.5 eV has a high degree of fluorination and a large discharge capacity. In the first fluorinated graphite prepared by pulverizing such second fluorinated graphite, because of its increased specific surface area, the current load per surface area of the fluorinated graphite is reduced. This is considered to result in an improvement of the utilization rate of the first fluorinated graphite and a further increase of the discharge capacity.

The particle diameter $D_{50}$ of the second fluorinated graphite when the volume fraction in a volume-accumulated particle size distribution is 50% is preferably more than 10 μm and 30 μm or less. When the particle diameter $D_{50}$ of the second fluorinated graphite is less than 10 μm, the high-temperature storage characteristics may be easily deteriorated. On the other hand, when the particle diameter $D_{50}$ of the second fluorinated graphite exceeds 30 μm, the reaction area in the second fluorinated graphite becomes too small, and the effect of ameliorating the discharge characteristics may not be sufficiently obtained. The particle diameter $D_{50}$ of the second fluorinated graphite is more preferably 10 μm or more and 20 μm or less.

There is no particular limitation on the composition of the second fluorinated graphite, and the second fluorinated graphite may be selected according to the reaction rate, the reaction duration, the conditions for fluorination, and the like. Examples of the second fluorinated graphite include one represented by the formula $(CF_x)_n$, where x is 0 or more to about 1.2; a second fluorinated graphite represented by the formula $(C_2F)_n$; and a mixture of these.

Above all, a second fluorinated graphite represented by the formula $(CF_x)_n$, where $0.4 \leq x \leq 1.15$, and n is an integer of 1 or more is preferably used. By using such fluorinated graphite, the high-temperature storage characteristics can be further ameliorated, and the discharge capacity can be further increased. When the value x, namely, the degree of fluorination, exceeds 1.15, the effect of reducing the overvoltage is abated since the content of fluorine is high, and therefore, sufficient discharge characteristics may not be obtained. When the degree of fluorination is less than 0.4, a sufficient energy density may not be obtained since the discharge capacity per weight of the fluorinated graphite is small. More preferably, the value x satisfies $0.90 \leq x \leq 1.15$.

The first fluorinated graphite can be obtained by adjusting the degree of surface fluorination of the second fluorinated graphite to 1.0 or more and less than 1.8. The first fluorinated graphite having a degree of surface fluorination of 1.0 or more and less than 1.8 is obtained by, for example, a method of dispersing the second fluorinated graphite in a polar solvent and irradiating it with ultraviolet rays, a method of dispersing the second fluorinated graphite in a polar solvent and reducing the surface thereof with a reducing agent such as hydrazine, a method of pulverizing the second fluorinated graphite to allow the interior of the particle where the fluorine content is low to be exposed on the surface, and other methods. Although the method of reducing the degree of surface fluorination of the second fluorinated graphite is not limited to these methods in the present invention, a method of pulverizing the second fluorinated graphite having a degree of surface fluorination of more than 1.8 is preferred. The first fluorinated graphite can be obtained by this method.

Examples of the method of pulverizing the second fluorinated graphite include wet pulverization and dry pulverization. The wet pulverization is performed by, for example, bead milling in which the second fluorinated graphite is dispersed in an organic solvent or an aqueous solution with a surfactant dissolved therein and, in this state, is subjected to impact pulverization by the collision with beads. The dry pulverization is performed by, for example, jet milling in which the second fluorinated graphite is subjected to impact pulverization by the collision between the second fluorinated graphite particles in a pressurized air stream. Among these, the dry pulverization is more preferred since the degree of fluorination and the crystallinity and the like are unlikely to change. The first fluorinated graphite prepared by pulverizing the second fluorinated graphite may be classified to adjust the particle size thereof.

On the surface of the second fluorinated graphite, most of the C—F bonds are in the form of a covalent bond, although some of them are bonds with weak binding strength. On the other hand, in the interior of the second fluorinated graphite, presumably, a larger amount of the C—F bonds having a low binding energy are present than on the surface. The C—F bonds having a low binding energy that are present in the inside of the second fluorinated graphite become exposed on the surface of the first fluorinated graphite by pulverizing the second fluorinated graphite. This improves the conductivity of the surface of the first fluorinated graphite. Due to the influence of the C—F bonds having a low binding energy, the C1s peak and the F1s peak observed in the XPS of the surface of the first fluorinated graphite shift to the low-energy side.

In other words, due to the pulverization of the second fluorinated graphite, the C—F bonding energy on the surface of the first fluorinated graphite is reduced, and the conductivity of the surface of the first fluorinated graphite is improved. This provides a remarkable effect of ameliorating the discharge characteristics.

In a volume-accumulated particle size distribution of a mixture of the first fluorinated graphite obtained by pulverizing the second fluorinated graphite and the second fluorinated graphite, usually two peaks are observed. One of the two peaks is in the region of, for example, 0.2 to 7 µm, and the other is in the region of, for example, 10 to 30 µm.

In the case of using such a mixture, in view of obtaining excellent discharge characteristics and high-temperature storage characteristics, the mixing ratio of the first fluorinated graphite to the second fluorinated graphite is preferably 10:90 to 90:10 by weight, and more preferably 25:75 to 75:25 by weight. When the mixing ratio of the first fluorinated graphite is less than 10 parts by weight per 100 parts by weight of the total of the first fluorinated graphite and the second fluorinated graphite, the amount of the first fluorinated graphite is insufficient, and the effect of ameliorating the discharge characteristics may not be sufficiently obtained. On the other hand, when the mixing ratio of the first fluorinated graphite exceeds 90 parts by weight per 100 parts by weight of the total of the first fluorinated graphite and the second fluorinated graphite, the high-temperature storage characteristics may be slightly deteriorated.

The first fluorinated graphite preferably has a higher potential than the second fluorinated graphite. In a battery using such first and second fluorinated graphites, the open-circuit voltage (OCV) is higher than in a battery using the second fluorinated graphite alone. The higher the content of the first fluorinated graphite in the positive electrode, the higher the OCV is. In the fluorinated graphite, the drop in voltage at the beginning of discharge is large since the overvoltage due to polarization during discharge is large; however, a higher OCV can provide a higher CCV.

The non-aqueous electrolyte battery of the present invention is mainly characterized by the fluorinated graphite serving as the positive electrode active material, and no particular limitation is imposed on the other components.

The positive electrode can be produced by, for example, mixing a positive electrode active material, a conductive material, and a binder to prepare a positive electrode material mixture, and molding and drying the prepared positive electrode material mixture into a disc.

Examples of the conductive material include graphites, carbon blacks such as acetylene black, Ketjen Black, furnace black, lamp black, and thermal black, carbon fibers, and metal fibers.

For the binder, any material known in this field may be used. Examples of such a material include polyethylene, polypropylene, polytetrafluoroethylene (PTFE), polyvinylidene fluoride (PVDF), styrene-butadiene rubber (SBR), tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinylether-tetrafluoroethylene copolymer, ethylene-acrylic acid copolymer or ($Na^+$) ion cross-linked material of the foregoing material, ethylene-methacrylic acid copolymer or ($Na^+$) ion cross-linked material of the foregoing material, ethylene-methyl acrylate copolymer or ($Na^+$) ion cross-linked material of the foregoing material, and ethylene-methyl methacrylate copolymer or ($Na^+$) ion cross-linked material of the foregoing material. These materials may be used alone or in combination of two or more.

The blending ratio of the positive electrode active material, the conductive material, and the binder is preferably such that the positive electrode active material is 60 to 95% by weight, the conductive material is 1 to 30% by weight, and the binder is 2 to 10% by weight.

For the negative electrode, at least one selected from the group consisting of metal lithium and a lithium alloy may be used. Examples of the lithium alloy include Li—Al alloy, Li—Sn alloy, Li—NiSi alloy, and Li—Pb alloy. Among these, Li—Al alloy is preferred.

The preparing method of a lithium alloy is not particularly limited. In view of providing a sufficient discharge capacity and stabilizing the internal resistance, the content of metal elements other than lithium in the lithium alloy is preferably 0.2% by weight to 15% by weight.

Preferred examples of the separator include nonwoven fabric made of polypropylene, polybutylene terephthalate, polyphenylene sulfide, or the like. When the battery is used in a high temperature environment, nonwoven fabric made of polybutylene terephthalate or nonwoven fabric made of polyphenylene sulfide is preferably used as the separator.

The non-aqueous electrolyte includes a non-aqueous solvent and a lithium salt dissolved in the non-aqueous solvent. Examples of the non-aqueous solvent include cyclic carbonic acid ester, chain carbonic acid ester, cyclic ether, chain ether, and lactones. These may be used alone or in combination of two or more. Among these, γ-butyrolactone is preferably used as a main solvent because of its stability over a wide range of temperatures.

Examples of the lithium salt include $LiClO_4$, $LiCF_3SO_3$, $LiN(CF_3SO_2)_2$, $LiN(C_2F_5SO_2)_2$, $LiN(CF_3SO_2)(C_4F_9SO_2)$, $LiBF_4$, and $LiPF_6$. These may be used alone or in combination of two or more. Among these, $LiBF_4$ is particularly preferably used because of its good affinity with fluorinated graphite and its capability of exerting stable discharge characteristics.

EXAMPLES

FIG. 1 shows a longitudinal cross-sectional view of a coin battery fabricated in Examples of the present invention. A description is given below with reference to the drawing.

Example 1A

(1) Preparation of Positive Electrode Active Material

A petroleum coke having a particle diameter $D_{50}$ of 20 μm was heated in a fluorine gas atmosphere, to give a second fluorinated graphite $(CF_{1.15})_n$ having a degree of surface fluorination of 1.8. The reaction conditions were such that the pressure of the fluorine gas was 0.5 atm ($5.07 \times 10^4$ Pa), the heating temperature was 400° C., and the reaction duration was 12 hours.

The second fluorinated graphite ($D_{50}$: 20 μm) was mixed with ethanol at a ratio of 20:80 by weight, to disperse the fluorinated graphite in the ethanol. The resultant mixture was irradiated with ultraviolet rays for 5 minutes using a low-pressure mercury lamp UL0-6DQ available from Ushio Inc. as an irradiation source, to cause some carbon-fluorine bonds on the second fluorinated graphite surface to rupture. In such a manner, fluorinated graphite $(CF_{1.15})_n$ (a first fluorinated graphite) having a degree of surface fluorination of 1.79 serving as the positive electrode active material was prepared.

(2) Formation of Positive Electrode Pellet

The first fluorinated graphite thus obtained was mixed with acetylene black serving as the conductive material and styrene-butadiene rubber serving as the binder at a ratio of 84:8:8 by solid content weight. The resultant mixture was dried at 80° C. and pulverized. The powder thus obtained was charged in a predetermined molding die, and compressed with a hydraulic press, to form a positive electrode pellet 12 having a diameter of 16 mm and a thickness of 3 mm. The positive electrode pellet 12 was dried with hot air of 150° C. for 5 hours prior to use in the process of fabricating a battery, to remove the moisture therefrom.

(3) Fabrication of Coin Battery

A disc of 18 mm in diameter was punched out from a 1.3-mm-thick sheet made of metal lithium. The disc was press-fit onto the inner side of a sealing plate 16 so as to be positioned coaxially with the sealing plate 16, whereby a negative electrode was formed.

On the metal lithium serving as the negative electrode, a separator 13 made of polybutylene terephthalate nonwoven fabric and the positive electrode pellet 12 were placed. Thereafter, a non-aqueous electrolyte solution was injected. For the non-aqueous electrolyte solution, a solution prepared by dissolving $LiBF_4$ serving as a solute in γ-butyrolactone serving as a non-aqueous solvent in a concentration of 1 mol/L was used.

The opening end of the battery case 11 was crimped onto the sealing plate 16 with the insulator gasket 15 interposed therebetween, to seal the battery case 11. In such a manner, a coin lithium primary battery having a diameter of 24.5 mm and a thickness of 5.0 mm was fabricated.

(4) Measurement Method of Physical Property Values of Fluorinated Graphite

[Particle Diameter $D_{50}$]

A volume-accumulated particle size distribution of the fluorinated graphite was measured using a laser diffraction/scattering particle size distribution analyzer LA-920 available from Horiba, Ltd., while the fluorinated graphite is dispersed in ethanol. The particle size distribution thus obtained was used to determine a particle diameter $D_{50}$. The measurement was performed at 20° C.

[Measurement of Molar Ratio x of Fluorine Atoms to Carbon Atoms in Fluorinated Graphite $(CF_x)_n$]

The measurement of a molar ratio x of fluorine atoms in the fluorinated graphite was performed in the following manner. A sample powder of fluorinated graphite was thermally decomposed at 1200° C. using an automatic combustion apparatus (AQF-100 available from Mitsubishi Chemical Corporation), and the generated gas was allowed to be absorbed in a predetermined amount of aqueous hydrogen peroxide. With respect to the gas-absorbed solution (the measurement sample) thus obtained, the fluoride ion concentration therein was quantified by ion chromatography using ICS-1500 available from Dionex Japan. On the basis of the content of fluorine in the measurement sample and the amount of the fluorinated graphite used, a compositional ratio of fluorine atoms to carbon atoms in the fluorinated graphite was determined.

[Measurement of Degree of Surface Fluorination and Peak Energy by XPS]

The measurement of a degree of surface fluorination (a concentration ratio (molar ratio) [F]/[C] on the surface) of the fluorinated graphite was performed in the following manner. A sample powder of fluorinated graphite was placed and held on a conductive double-sided adhesive tape adhered onto an 8-mm-square aluminum substrate. An aluminum sheet mask with a Ø1 mm opening provided in the center thereof was placed on the sample powder of fluorinated graphite, on which gold was then vapor-deposited to partially coat the sample powder with gold. With respect to the measurement sample thus prepared, a wide-scan spectrum and narrow-scan spectra were measured with XPS-7000 available from Rigaku Corporation by using Mg—Kα rays as a radiation source. The measurement conditions for the wide-scan spectrum were 5 kV and 5 mA; and the measurement conditions for the narrow-scan spectra were 10 kV and 10 mA. In the measurement, a wide-scan spectrum ranging from 0 to 1000 eV was measured first, and then narrow-scan spectra of C1s peak, F1s peak, and O1s peak were measured.

In the C1s spectrum of the fluorinated graphite, two peaks attributed to a C—F bond and a carbon component were observed. Here, when the position of the peak attributed to a carbon component was not at 284.2 eV, an electrostatic charge correction was performed on the assumption that the position of the carbon component peak was at 284.2 eV. The electrostatic charge correction was performed by using the position of Au4f peak (at 84 eV) of the gold that was vapor-deposited on the sample, as a reference.

After a background correction was performed for each of the C1s and F1s peaks, the integrated area intensity of each of the C1s and F1s peaks was determined, and then the concentrations of carbon atoms and fluorine atoms were determined using the sensitivity factors of carbon element and fluorine element. From the values thus determined, the concentration ratio [F]/[C] of fluorine atoms to carbon atoms on the surface of the fluorinated graphite was calculated.

[Total Pore Volume]

The total pore volume of the fluorinated graphite was measured with a micromeritics automatic surface area and porosimetry analyzer TriStar 3000 available from Shimadzu Corporation by a nitrogen gas adsorption method.

In the following Examples and Comparative Examples, the physical property values of the fluorinated graphite were measured in the same manner as described above.

Example 2A

The duration of the ultraviolet irradiation on the $(CF_{1.15})_n$ having a degree of surface fluorination of 1.80 performed in Example 1A was changed to 20 minutes, to give a first fluorinated graphite $(CF_{1.15})_n$ having a degree of surface fluorination of 1.70. A battery of Example 2A was fabricated in the same manner as in Example 1A, except that the first fluorinated graphite thus obtained was used.

Example 3A

The duration of the ultraviolet irradiation on the $(CF_{1.15})_n$ having a degree of surface fluorination of 1.80 performed in Example 1A was changed to 1 hour, to give a first fluorinated graphite $(CF_{1.15})_n$ having a degree of surface fluorination of 1.30. A battery of Example 3A was fabricated in the same manner as in Example 1A, except that the first fluorinated graphite thus obtained was used.

Example 4A

The duration of the ultraviolet irradiation on the $(CF_{1.15})_n$ having a degree of surface fluorination of 1.80 performed in Example 1A was changed to 2 hours, to give a first fluorinated graphite $(CF_{1.09})_n$ having a degree of surface fluorination of 1.10. A battery of Example 4A was fabricated in the same manner as in Example 1A, except that the first fluorinated graphite thus obtained was used.

Example 5A

The duration of the ultraviolet irradiation on the $(CF_{1.15})_n$ having a degree of surface fluorination of 1.80 performed in Example 1A was changed to 3 hours, to give a first fluorinated graphite $(CF_{0.90})_n$ having a degree of surface fluorination of 1.00. A battery of Example 5A was fabricated in the same manner as in Example 1A, except that the first fluorinated graphite thus obtained was used.

Example 6A

A petroleum coke having a particle diameter $D_{50}$ of 20 μm was heated in a fluorine gas atmosphere, to give a second fluorinated graphite $(CF_{1.20})_n$ having a degree of surface fluorination of 1.80. The reaction conditions were such that the pressure of the fluorine gas was 0.5 atm, the heating temperature was 400° C., and the reaction duration was 16 hours.

The second fluorinated graphite thus obtained was mixed with ethanol at a ratio of 20:80 by weight, to disperse the fluorinated graphite in the ethanol. The resultant mixture was irradiated with ultraviolet rays for 1 hour, to give a first fluorinated graphite $(CF_{1.20})_n$ having a degree of surface fluorination of 1.30. A battery of Example 6A was fabricated in the same manner as in Example 1A, except that the first fluorinated graphite thus obtained was used.

Example 7A

A petroleum coke having a particle diameter $D_{50}$ of 20 μm was heated in a fluorine gas atmosphere, to give a second fluorinated graphite $(CF_{1.10})_n$ having a degree of surface fluorination of 1.80. The reaction conditions were such that the pressure of the fluorine gas was 0.5 atm, the heating temperature was 400° C., and the reaction duration was 10 hours.

The second fluorinated graphite thus obtained was mixed with ethanol at a ratio of 20:80 by weight, to disperse the fluorinated graphite in the ethanol. The resultant mixture was irradiated with ultraviolet rays for 1 hour, to give a first fluorinated graphite $(CF_{1.10})_n$ having a degree of surface fluorination of 1.30. A battery of Example 7A was fabricated in the same manner as in Example 1A, except that the first fluorinated graphite thus obtained was used.

Example 8A

A petroleum coke having a particle diameter $D_{50}$ of 20 μm was heated in a fluorine gas atmosphere, to give a second fluorinated graphite $(CF_{0.80})_n$ having a degree of surface fluorination of 1.80. The reaction conditions were such that the pressure of the fluorine gas was 1 atm, the heating temperature was 400° C., and the reaction duration was 6 hours.

The second fluorinated graphite thus obtained was mixed with ethanol at a ratio of 20:80 by weight, to disperse the fluorinated graphite in the ethanol. The resultant mixture was irradiated with ultraviolet rays for 1 hour, to give a first fluorinated graphite $(CF_{0.80})_n$ having a degree of surface fluorination of 1.30. A battery of Example 8A was fabricated in the same manner as in Example 1A, except that the first fluorinated graphite thus obtained was used.

Example 9A

A petroleum coke having a particle diameter $D_{50}$ of 20 μm was heated in a fluorine gas atmosphere, to give a second fluorinated graphite $(CF_{0.50})_n$ having a degree of surface fluorination of 1.80. The reaction conditions were such that the pressure of the fluorine gas was 1 atm, the heating temperature was 340° C., and the reaction duration was 8 hours.

The second fluorinated graphite thus obtained was mixed with ethanol at a ratio of 20:80 by weight, to disperse the fluorinated graphite in the ethanol. The resultant mixture was irradiated with ultraviolet rays for 1 hour, to give a first fluorinated graphite $(CF_{0.50})_n$ having a degree of surface fluorination of 1.30. A battery of Example 9A was fabricated in the same manner as in Example 1A, except that the first fluorinated graphite thus obtained was used.

Example 10A

A petroleum coke having a particle diameter $D_{50}$ of 20 μm was heated in a fluorine gas atmosphere, to give a second fluorinated graphite $(CF_{0.40})_n$ having a degree of surface fluorination of 1.80. The reaction conditions were such that the pressure of the fluorine gas was 1 atm, the heating temperature was 340° C., and the reaction duration was 5 hours.

The second fluorinated graphite thus obtained was mixed with ethanol at a ratio of 20:80 by weight, to disperse the fluorinated graphite in the ethanol. The resultant mixture was irradiated with ultraviolet rays for 1 hour, to give a first fluorinated graphite $(CF_{0.40})_n$ having a degree of surface fluorination of 1.30. A battery of Example 10A was fabricated in the same manner as in Example 1A, except that the first fluorinated graphite thus obtained was used.

Example 11A

A petroleum coke having a particle diameter $D_{50}$ of 20 μm was heated in a fluorine gas atmosphere, to give a second fluorinated graphite $(CF_{0.30})_n$ having a degree of surface fluorination of 1.80. The reaction conditions were such that the pressure of the fluorine gas was 1 atm, the heating temperature was 340° C., and the reaction duration was 3 hours.

The second fluorinated graphite thus obtained was mixed with ethanol at a ratio of 20:80 by weight, to disperse the fluorinated graphite in the ethanol. The resultant mixture was irradiated with ultraviolet rays for 1 hour, to give a first fluorinated graphite $(CF_{0.30})_n$ having a degree of surface fluorination of 1.30. A battery of Example 11A was fabricated in the same manner as in Example 1A, except that the first fluorinated graphite thus obtained was used.

Example 12A

The second fluorinated graphite $(CF_{1.10})_n$ having a degree of surface fluorination of 1.80 prepared in Example 7A was mixed with an aqueous solution of 1 wt % nonionic surfactant Triton X-100 at a ratio of 10:90 by weight, to disperse the second fluorinated graphite in the foregoing aqueous solution.

Next, the second fluorinated graphite was wet-pulverized in a wet-pulverizer/disperser DYNO-MILL TYPE KD-6 available from Shinmaru Enterprises Corporation by using Ø0.65 mm zirconia beads, to decrease the degree of surface fluorination. The pulverization was performed until the particle diameter $D_{50}$ reached 15 μm. In such a manner, a first fluorinated graphite $(CF_{1.10})_n$ having a degree of surface fluorination of 1.30 was obtained. A battery of Example 12A was fabricated in the same manner as in Example 1A, except that the first fluorinated graphite thus obtained was used.

Example 13A

The wet-pulverization as performed in Example 12A was repeated until the second fluorinated graphite was pulverized to a particle diameter $D_{50}$ of 10 μm. In such a manner, a first fluorinated graphite $(CF_{1.10})_n$ having a degree of surface fluorination of 1.30 was obtained. A battery of Example 13A was fabricated in the same manner as in Example 1A, except that the first fluorinated graphite thus obtained was used.

Example 14A

The wet-pulverization as performed in Example 12A was repeated until the second fluorinated graphite was pulverized to a particle diameter $D_{50}$ of 3 μm. In such a manner, a first fluorinated graphite $(CF_{1.10})_n$ having a degree of surface fluorination of 1.30 was obtained. A battery of Example 14A was fabricated in the same manner as in Example 1, except that the first fluorinated graphite thus obtained was used.

Example 15A

The wet-pulverization as performed in Example 12A was repeated the second fluorinated graphite was pulverized to a particle diameter $D_{50}$ of 1 μm. In such a manner, a first fluorinated graphite $(CF_{1.10})_n$ having a degree of surface fluorination of 1.30 was obtained. A battery of Example 15A was fabricated in the same manner as in Example 1A, except that the first fluorinated graphite thus obtained was used.

Example 16A

The wet-pulverization as performed in Example 12A was repeated until the second fluorinated graphite was pulverized to a particle diameter $D_{50}$ of 0.5 μm. In such a manner, a first fluorinated graphite $(CF_{1.10})_n$ having a degree of surface fluorination of 1.30 was obtained. A battery of Example 16A was fabricated in the same manner as in Example 1A, except that the first fluorinated graphite thus obtained was used.

Example 17A

The wet-pulverization as performed in Example 12A was repeated until the second fluorinated graphite was pulverized to a particle diameter $D_{50}$ of 0.1 μm. In such a manner, a first fluorinated graphite $(CF_{1.10})_n$ having a degree of surface fluorination of 1.30 was obtained. A battery of Example 17A was fabricated in the same manner as in Example 1A, except that the first fluorinated graphite thus obtained was used.

Example 1B (1) Preparation of Positive Electrode Active Material

A petroleum coke having a particle diameter $D_{50}$ of 20 μm was heated in a fluorine gas atmosphere, to give a second fluorinated graphite $(CF_{0.30})_n$. The reaction conditions were such that the pressure of the fluorine gas was 0.5 atm, the heating temperature was 400° C., and the reaction duration was 2 hours. The C1s peak attributed to a C—F bond in the second fluorinated graphite was at 290.1 eV, and the F1s peak attributed to a C—F bond was at 688.6 eV.

The second fluorinated graphite ($D_{50}$: 20 μm) was dry-pulverized in NanoJetmizer NJ-100 available from Aishin Nano Technologies Co., Ltd. until the particle diameter $D_{50}$ reached 12 μm. In such a manner, a first fluorinated graphite $(CF_{0.30})_n$ was prepared. The degree of surface fluorination of the first fluorinated graphite was 1.70. The C1s peak attributed to a C—F bond in the first fluorinated graphite was at 290.0 eV, and the F1s peak attributed to a C—F bond was at 688.5 eV.

(2) Formation of Positive Electrode Pellet

The first fluorinated graphite thus prepared was mixed with acetylene black serving as the conductive material and styrene-butadiene rubber (SBR) serving as the binder at a ratio of 84:8:8 by solid content weight. The resultant mixture was dried at 80° C., then pulverized, and sieved through a sieve having a mesh size of 50 μm. The powder thus obtained was charged in a pellet molding die, and compressed with a hydraulic press, to form a positive electrode pellet 12 having a diameter of 16 mm and a thickness of 3 mm. The positive electrode pellet 12 was dried for 5 hours with hot air at 150° C. prior to use in the process of fabricating a battery, to remove the moisture therefrom.

A battery of Example 1B was fabricated in the same manner as in Example 1A, except that the positive electrode thus obtained was used.

Example 2B

A petroleum coke having a particle diameter $D_{50}$ of 30 μm was heated in a fluorine gas atmosphere, to give a second fluorinated graphite $(CF_{0.30})_n$ having a particle diameter $D_{50}$ of 30 μm. The reaction conditions were such that the pressure of the fluorine gas was 0.5 atm, the heating temperature was 400° C., and the reaction duration was 2.5 hours. The C1s peak attributed to a C—F bond in the second fluorinated graphite was at 290.2 eV, and the F1s peak attributed to a C—F bond was at 688.7 eV.

The second fluorinated graphite thus obtained was dry-pulverized in the same manner as in Example 1B until the particle diameter $D_{50}$ reached 12 μm, to give a first fluorinated graphite $(CF_{0.30})_n$. The degree of surface fluorination of the first fluorinated graphite was 1.50. The C1s peak attributed to a C—F bond in the first fluorinated graphite was at 289.0 eV, and the F is peak attributed to a C—F bond was at 687.5 eV. A battery of Example 2B was fabricated in the same manner as in Example 1B, except that the first fluorinated graphite thus obtained was used.

Example 3B

A petroleum coke having a particle diameter $D_{50}$ of 40 μm was heated in a fluorine gas atmosphere, to give a second fluorinated graphite $(CF_{0.30})_n$ having a particle diameter $D_{50}$ of 40 μm. The reaction conditions were such that the pressure of the fluorine gas was 0.5 atm, the heating temperature was 400° C., and the reaction duration was 3 hours. The C1s peak attributed to a C—F bond in the second fluorinated graphite was at 290.2 eV, and the F1s peak attributed to a C—F bond was at 688.7 eV.

The second fluorinated graphite thus obtained was dry-pulverized in the same manner as in Example 1B until the particle diameter $D_{50}$ reached 12 μm, to give a first fluorinated graphite $(CF_{0.30})_n$. The degree of surface fluorination of the first fluorinated graphite was 1.30. The C1s peak attributed to a C—F bond in the first fluorinated graphite was at 288 eV, and the F1s peak attributed to a C—F bond was at 686.5 eV. A battery of Example 3B was fabricated in the same manner as in Example 1B, except that the first fluorinated graphite thus obtained was used.

Example 4B

A petroleum coke having a particle diameter $D_{50}$ of 45 μm was heated in a fluorine gas atmosphere, to give a second fluorinated graphite $(CF_{0.30})_n$ having an average particle diameter $D_{50}$ of 40 μm. The reaction conditions were such that the pressure of the fluorine gas was 0.5 atm, the heating temperature was 400° C., and the reaction duration was 3.2 hours. The C1s peak attributed to a C—F bond in the second fluorinated graphite was at 290.2 eV, and the F1s peak attributed to a C—F bond was at 688.8 eV.

The second fluorinated graphite thus obtained was dry-pulverized in the same manner as in Example 1B until the particle diameter $D_{50}$ reached 12 μm, to give a first fluorinated graphite $(CF_{0.30})_n$. The degree of surface fluorination of the first fluorinated graphite was 1.20. The C1s peak attributed to a C—F bond in the first fluorinated graphite was at 287.9 eV, and the F1s peak attributed to a C—F bond was at 686.3 eV. A battery of Example 4B was fabricated in the same manner as in Example 1B, except that the first fluorinated graphite thus obtained was used.

Example 5B

The $(CF_{0.30})_n$ having a $D_{50}$ of 20 μm prepared in Example 1B was dry-pulverized in the same manner as in Example 1B until the particle diameter $D_{50}$ reached 10 μm, to give a first fluorinated graphite $(CF_{0.30})_n$. The degree of surface fluorination of the first fluorinated graphite was 1.50. The C1s peak attributed to a C—F bond in the first fluorinated graphite was at 289.7 eV, and the F1s peak attributed to a C—F bond was at 688.3 eV. A battery of Example 5B was fabricated in the same manner as in Example 1B, except that the first fluorinated graphite thus obtained was used.

Example 6B

The $(CF_{0.30})_n$ having a $D_{50}$ of 20 μm prepared in Example 1B was dry-pulverized in the same manner as in Example 1 until the particle diameter $D_{50}$ reached 3 μm, to give a first fluorinated graphite $(CF_{0.30})_n$. The degree of surface fluorination of the first fluorinated graphite was 1.35. The C1s peak attributed to a C—F bond in the first fluorinated graphite was at 289.5 eV, and the F1s peak attributed to a C—F bond was at 688 eV. A battery of Example 6B was fabricated in the same manner as in Example 1B, except that the first fluorinated graphite thus obtained was used.

Example 7B

The $(CF_{0.30})_n$ having a $D_{50}$ of 20 μm prepared in Example 1B was dry-pulverized in the same manner as in Example 1 until the particle diameter $D_{50}$ reached 1 μm, to give a first fluorinated graphite $(CF_{0.30})_n$. The degree of surface fluorination of the first fluorinated graphite was 1.20. The C1s peak attributed to a C—F bond in the first fluorinated graphite was at 289 eV, and the F1s peak attributed to a C—F bond was at 687.5 eV. A battery of Example 7B was fabricated in the same manner as in Example 1B, except that the first fluorinated graphite thus obtained was used.

Example 8B

The $(CF_{0.30})_n$ having a $D_{50}$ of 20 μm prepared in Example 1B was dry-pulverized in the same manner as in Example 1 until the particle diameter $D_{50}$ reached 0.5 μm, to give a first fluorinated graphite $(CF_{0.30})_n$. The degree of surface fluorination of the first fluorinated graphite was 1.15. The C1s peak attributed to a C—F bond in the first fluorinated graphite was at 288.5 eV, and the F1s peak attributed to a C—F bond was at 687 eV. A battery of Example 8B was fabricated in the same manner as in Example 1B, except that the first fluorinated graphite thus obtained was used.

Example 9B

The $(CF_{0.30})_n$ having a $D_{50}$ of 20 prepared in Example 1B was dry-pulverized in the same manner as in Example 1 until the particle diameter $D_{50}$ reached 0.1 μm, to give a first fluorinated graphite $(CF_{0.30})_n$. The degree of surface fluorination of the first fluorinated graphite was 1.05. The C1s peak attributed to a C—F bond in the first fluorinated graphite was at 288 eV, and the F1s peak attributed to a C—F bond was at 686.5 eV. A battery of Example 9B was fabricated in the same manner as in Example 1B, except that the first fluorinated graphite thus obtained was used.

Example 10B

The $(CF_{0.30})_n$ having a $D_{50}$ of 0.1 μm prepared in Example 9B was mixed with isopropyl alcohol at a ratio of 20:80 by weight, to disperse the fluorinated graphite in the isopropyl alcohol. The fluorinated graphite was classified with a wet centrifugal classifier LC-1000 available from MATSUBO Corporation, to give a first fluorinated graphite $(CF_{0.30})_n$ having a particle diameter $D_{50}$ of 0.05 μm. The degree of surface fluorination of the first fluorinated graphite was 1.00. The C1s peak attributed to a C—F bond in the first fluorinated graphite was at 287.9 eV, and the F1s peak attributed to a C—F bond was at 686.3 eV. A battery of Example 10B was fabricated in the same manner as in Example 1B, except that the first fluorinated graphite thus obtained was used.

Example 11B

A petroleum coke having a particle diameter $D_{50}$ of 20 μm was heated in a fluorine gas atmosphere, to give a second fluorinated graphite $(CF_{1.20})_n$ having a particle diameter $D_{50}$ of 20 μm. The reaction conditions were such that the pressure of the fluorine gas was 0.5 atm, the heating temperature was 400° C., and the reaction duration was 16 hours. The C1s peak attributed to a C—F bond in the second fluorinated graphite was at 290.3 eV, and the F1s peak attributed to a C—F bond was at 688.8 eV.

The second fluorinated graphite thus obtained was dry-pulverized in the same manner as in Example 1B until the particle diameter $D_{50}$ reached 1 μm, to give a first fluorinated graphite $(CF_{1.20})_n$. The degree of surface fluorination of the first fluorinated graphite was 1.20. The C1s peak attributed to a C—F bond in the first fluorinated graphite was at 289 eV, and the F1s peak attributed to a C—F bond was at 687.5 eV. A battery of Example 11B was fabricated in the same manner as in Example 1B, except that the first fluorinated graphite thus obtained was used.

Example 12B

A petroleum coke having a particle diameter $D_{50}$ of 20 μm was heated in a fluorine gas atmosphere, to give a second fluorinated graphite $(CF_{1.15})_n$ having a particle diameter $D_{50}$ of 20 μm. The reaction conditions were such that the pressure of the fluorine gas was 0.5 atm, the heating temperature was 400° C., and the reaction duration was 14 hours. The C1s peak attributed to a C—F bond in the second fluorinated graphite was at 290.2 eV, and the F1s peak attributed to a C—F bond was at 688.7 eV.

The second fluorinated graphite thus obtained was dry-pulverized in the same manner as in Example 1B until the particle diameter $D_{50}$ reached 1 μm, to give a first fluorinated graphite $(CF_{1.15})_n$. The degree of surface fluorination of the first fluorinated graphite was 1.20. The C1s peak attributed to a C—F bond in the first fluorinated graphite was at 289 eV, and the F1s peak attributed to a C—F bond was at 687.5 eV. A battery of Example 12B was fabricated in the same manner as in Example 1B, except that the first fluorinated graphite thus obtained was used.

Example 13B

A petroleum coke having a particle diameter $D_{50}$ of 20 μm was heated in a fluorine gas atmosphere, to give a second fluorinated graphite $(CF_{1.10})_n$ having a particle diameter $D_{50}$ of 20 μm. The reaction conditions were such that the pressure of the fluorine gas was 0.5 atm, the heating temperature was 400° C., and the reaction duration was 11 hours. The C1s peak attributed to a C—F bond in the second fluorinated graphite was at 290.2 eV, and the F1s peak attributed to a C—F bond was at 688.6 eV.

The second fluorinated graphite thus obtained was dry-pulverized in the same manner as in Example 1B until the particle diameter $D_{50}$ reached 1 μm, to give a first fluorinated graphite $(CF_{1.10})_n$. The degree of surface fluorination of the first fluorinated graphite was 1.20. The C1s peak attributed to a C—F bond in the first fluorinated graphite was at 289 eV, and the F1s peak attributed to a C—F bond was at 687.5 eV.

A battery of Example 13B was fabricated in the same manner as in Example 1B, except that the first fluorinated graphite thus obtained was used.

Example 14B

A petroleum coke having a particle diameter $D_{50}$ of 20 μm was heated in a fluorine gas atmosphere, to give a second fluorinated graphite $(CF_{0.90})_n$ having an average particle diameter $D_{50}$ of 20 μm. The reaction conditions were such that the pressure of the fluorine gas was 0.5 atm, the heating temperature was 400° C., and the reaction duration was 9 hours. The C1s peak attributed to a C—F bond in the second fluorinated graphite was at 290.2 eV, and the F1s peak attributed to a C—F bond was at 688.6 eV.

The second fluorinated graphite thus obtained was dry-pulverized in the same manner as in Example 1B until the particle diameter $D_{50}$ reached 1 μm, to give a first fluorinated graphite $(CF_{0.90})_n$. The degree of surface fluorination of the first fluorinated graphite was 1.20. The C1s peak attributed to a C—F bond in the first fluorinated graphite was at 289 eV, and the F1s peak attributed to a C—F bond was at 687.5 eV. A battery of Example 14B was fabricated in the same manner as in Example 1B, except that the first fluorinated graphite thus obtained was used.

Example 15B

A petroleum coke having a particle diameter $D_{50}$ of 20 μm was heated in a fluorine gas atmosphere, to give a second fluorinated graphite $(CF_{0.50})_n$ having a particle diameter $D_{50}$ of 20 μm. The reaction conditions were such that the pressure of the fluorine gas was 0.5 atm, the heating temperature was 400° C., and the reaction duration was 4.5 hours. The C1s peak attributed to a C—F bond in the second fluorinated graphite was at 290.1 eV, and the F1s peak attributed to a C—F bond was at 688.6 eV.

The second fluorinated graphite thus obtained was dry-pulverized in the same manner as in Example 1B until the particle diameter $D_{50}$ reached 1 μm, to give a first fluorinated graphite $(CF_{0.50})_n$. The degree of surface fluorination of the first fluorinated graphite was 1.20. The C1s peak attributed to a C—F bond in the first fluorinated graphite was at 289 eV, and the F1s peak attributed to a C—F bond was at 687.5 eV. A battery of Example 15B was fabricated in the same manner as in Example 1B, except that the first fluorinated graphite thus obtained was used.

Example 16B

A petroleum coke having a particle diameter $D_{50}$ of 20 μm was heated in a fluorine gas atmosphere, to give a second fluorinated graphite $(CF_{0.40})_n$ having a particle diameter $D_{50}$ of 20 μm. The reaction conditions were such that the pressure of the fluorine gas was 1 atm, the heating temperature was 400° C., and the reaction duration was 4 hours. The C1s peak attributed to a C—F bond in the second fluorinated graphite was at 290.1 eV, and the F1s peak attributed to a C—F bond was at 688.5 eV.

The second fluorinated graphite thus obtained was dry-pulverized in the same manner as in Example 1B until the particle diameter $D_{50}$ reached 1 μm, to give a first fluorinated graphite $(CF_{0.40})_n$. The degree of surface fluorination of the first fluorinated graphite was 1.20. The C1s peak attributed to a C—F bond in the first fluorinated graphite was at 289 eV, and the F1s peak attributed to a C—F bond was at 687.5 eV.

A battery of Example 16B was fabricated in the same manner as in Example 1B, except that the first fluorinated graphite thus obtained was used.

Example 1C (1) Preparation of Positive Electrode Active Material

A petroleum coke having an average particle diameter $D_{50}$ of 13 μm was heated in a fluorine gas atmosphere, to give a second fluorinated graphite $(CF_{1.0})_n$. The reaction conditions were such that the pressure of the fluorine gas was 0.5 atm, the heating temperature was 400° C., and the reaction duration was 10 hours. The second fluorinated graphite thus obtained was dry-pulverized in NanoJetmizer NJ-100 available from Aishin Nano Technologies Co., Ltd., to give a first fluorinated graphite having an average particle diameter $D_{50}$ of 0.2 μm. The degrees of surface fluorination of the first and second fluorinated graphites were 1.00 and 1.85, respectively. The first fluorinated graphite was mixed with the second fluorinated graphite at a ratio of 50:50 by weight, to give a positive electrode active material.

(2) Formation of Positive Electrode

The positive electrode active material obtained in the above was mixed with acetylene black serving as the conductive material and Neoflon ND-1 available from Daikin Industries, Ltd. serving as the binder at a ratio of 85:8:7 by solid content weight, to give a positive electrode material mixture. The positive electrode material mixture was dried at 70° C., then pulverized, and sieved through a sieve having a mesh size of 500 μm, to give a powder. The powder was charged in a pellet molding die, and compressed with a hydraulic press, to mold a positive electrode 12 in the form of a pellet (diameter: 16 mm, thickness: 3 mm). The positive electrode 12 was dried for 5 hours with hot air at 250° C. prior to use in the process of fabricating a battery, to remove the moisture therefrom.

A battery of Example 10 was fabricated in the same manner as in Example 1A, except that the positive electrode thus obtained was used.

Example 2C

The second fluorinated graphite having an average particle diameter $D_{50}$ of 13 μm prepared in Example 10 was dry-pulverized, to give a first fluorinated graphite having an average particle diameter $D_{50}$ of 0.5 μm. The degree of surface fluorination of the first fluorinated graphite was 1.05. A battery was fabricated in the same manner as in Example 10, except that the first fluorinated graphite thus obtained was used.

Example 3C

The second fluorinated graphite having an average particle diameter $D_{50}$ of 13 μm prepared in Example 10 was dry-pulverized, to give a first fluorinated graphite having an average particle diameter $D_{50}$ of 1 μm. The degree of surface fluorination of the first fluorinated graphite was 1.20. A battery was fabricated in the same manner as in Example 10, except that the first fluorinated graphite thus obtained was used.

Example 4C

The second fluorinated graphite having an average particle diameter $D_{50}$ of 13 μm prepared in Example 10 was dry-pulverized, to give a first fluorinated graphite having an average particle diameter $D_{50}$ of 3 μm. The degree of surface fluorination of the first fluorinated graphite was 1.35. A battery was fabricated in the same manner as in Example 10, except that the first fluorinated graphite thus obtained was used.

Example 5C

The second fluorinated graphite having an average particle diameter $D_{50}$ of 13 μm prepared in Example 10 was dry-pulverized, to give a first fluorinated graphite having an average particle diameter $D_{50}$ of 7 μm. The degree of surface fluorination of the first fluorinated graphite was 1.40. A battery was fabricated in the same manner as in Example 10, except that the first fluorinated graphite thus obtained was used.

Example 6C

A petroleum coke having an average particle diameter $D_{50}$ of 10 μm was heated in a fluorine gas atmosphere, to give a second fluorinated graphite $(CF_{1.0})_n$. The reaction conditions were such that the pressure of the fluorine gas was 0.5 atm, the heating temperature was 400° C., and the reaction duration was 9 hours. A battery was fabricated in the same manner as in Example 3C, except that the second fluorinated graphite thus obtained was used. The degrees of surface fluorination of the first and second fluorinated graphites were 1.20 and 1.85, respectively.

Example 7C

A petroleum coke having an average particle diameter $D_{50}$ of 30 μm was heated in a fluorine gas atmosphere, to give a second fluorinated graphite $(CF_{1.0})_n$. The reaction conditions were such that the pressure of the fluorine gas was 0.5 atm, the heating temperature was 400° C., and the reaction duration was 12 hours. A battery was fabricated in the same manner as in Example 3C, except that the second fluorinated graphite thus obtained was used. The degrees of surface fluorination of the first and second fluorinated graphites were 1.20 and 1.90, respectively.

Example 8C

A battery was fabricated in the same manner as in Example 3C, except that the mixing ratio of the first fluorinated graphite to the second fluorinated graphite was changed to 10:90 by weight.

Example 9C

A battery was fabricated in the same manner as in Example 3C, except that the mixing ratio of the first fluorinated graphite to the second fluorinated graphite was changed to 25:75 by weight.

Example 10C

A battery was fabricated in the same manner as in Example 3C, except that the mixing ratio of the first fluorinated graphite to the second fluorinated graphite was changed to 40:60 by weight.

Example 11C

A battery was fabricated in the same manner as in Example 3C, except that the mixing ratio of the first fluorinated graphite to the second fluorinated graphite was changed to 60:40 by weight.

Example 12C

A battery was fabricated in the same manner as in Example 3C, except that the mixing ratio of the first fluorinated graphite to the second fluorinated graphite was changed to 75:25 by weight.

Example 13C

A battery was fabricated in the same manner as in Example 3C, except that the mixing ratio of the first fluorinated graphite to the second fluorinated graphite was changed to 90:10 by weight.

Example 14C

The second fluorinated graphite having an average particle diameter $D_{50}$ of 13 μm prepared in Example 10 was dry-pulverized until the average particle diameter $D_{50}$ reached 0.1 μm, to give a first fluorinated graphite. The degree of surface fluorination of the first fluorinated graphite was 1.05. A battery was fabricated in the same manner as in Example 10, except that the first fluorinated graphite thus obtained was used.

Example 15C

The second fluorinated graphite having an average particle diameter $D_{50}$ of 13 μm prepared in Example 10 was dry-pulverized until the average particle diameter $D_{50}$ reached 9 μm, to give a first fluorinated graphite. The degree of surface fluorination of the first fluorinated graphite was 1.45. A battery was fabricated in the same manner as in Example 10, except that the first fluorinated graphite thus obtained was used.

Example 16C

A petroleum coke having an average particle diameter $D_{50}$ of 5 μm was heated in a fluorine gas atmosphere, to give a second fluorinated graphite $(CF_{1.0})_n$. The reaction conditions were such that the pressure of the fluorine gas was 0.5 atm, the heating temperature was 400° C., and the reaction duration was 8 hours. A battery was fabricated in the same manner as in Example 3C, except that the second fluorinated graphite thus obtained was used. The degrees of surface fluorination of the first and second fluorinated graphites were 1.20 and 1.83, respectively.

Example 17C

A petroleum coke having an average particle diameter $D_{50}$ of 40 μm was heated in a fluorine gas atmosphere, to give a second fluorinated graphite $(CF_{1.0})_n$. The reaction conditions were such that the pressure of the fluorine gas was 0.5 atm, the heating temperature was 400° C., and the reaction duration was 16 hours. A battery was fabricated in the same manner as in Example 3C, except that the second fluorinated graphite thus obtained was used. The degrees of surface fluorination of the first and second fluorinated graphites were 1.20 and 1.90, respectively.

Comparative Example 1A

A battery of Comparative Example 1 was fabricated in the same manner as in Example 1A, except that the second fluorinated graphite prepared in Example 1A (the $(CF_{1.15})_n$ having a degree of surface fluorination of 1.80) was used alone as the positive electrode active material.

Comparative Example 2A

The duration of the ultraviolet irradiation performed in Example 1A was changed to 24 hours, to give $(CF_{0.76})_n$ having a degree of surface fluorination of 0.90. A battery of Comparative Example 2 was fabricated in the same manner as in Example 1A, except that the fluorinated graphite thus prepared was used alone.

Comparative Example 1B

A battery of Comparative Example 1B was fabricated in the same manner as in Example 1B, except that the second fluorinated graphite prepared in Example 1B (the $(CF_{0.30})_n$ having a particle diameter $D_{50}$ of 20 μm) was used alone as the positive electrode active material. The degree of surface fluorination of the second fluorinated graphite was 1.85.

Comparative Example 2B

A battery of Comparative Example 2B was fabricated in the same manner as in Example 1B, except that the second fluorinated graphite prepared in Example 2B (the $(CF_{0.30})_n$ having a particle diameter $D_{50}$ of 30 μm) was used alone as the positive electrode active material. The degree of surface fluorination of the second fluorinated graphite was 1.88.

Comparative Example 3B

A battery of Comparative Example 3B was fabricated in the same manner as in Example 1B, except that the second fluorinated graphite prepared in Example 3B (the $(CF_{0.30})_n$ having a particle diameter $D_{50}$ of 40 μm) was used alone as the positive electrode active material. The degree of surface fluorination of the second fluorinated graphite was 1.90.

Comparative Example 4B

A battery of Comparative Example 4B was fabricated in the same manner as in Example 1B, except that the second fluorinated graphite prepared in Example 4B (the $(CF_{0.30})_n$ having a particle diameter $D_{50}$ of 45 μm) was used alone as the positive electrode active material. The degree of surface fluorination of the second fluorinated graphite was 1.95.

Comparative Example 5B

A petroleum coke having a particle diameter $D_{50}$ of 12 μm was heated in a fluorine gas atmosphere, to give a fluorinated graphite $(CF_{0.30})_n$ having a particle diameter $D_{50}$ of 12 μm. The reaction conditions were such that the pressure of the fluorine gas was 0.5 atm, the heating temperature was 400° C., and the reaction duration was 1.5 hours. The C1s peak attributed to a C—F bond in the fluorinated graphite was at 290.2 eV, and the F1s peak attributed to a C—F bond was at 688.7 eV. A battery of Comparative Example 5B was fabricated in the same manner as in Example 1B, except that the fluorinated graphite thus obtained was used as the positive electrode active material. The degree of surface fluorination of the fluorinated graphite was 1.85.

Comparative Example 6B

A battery of Comparative Example 6B was fabricated in the same manner as in Example 1B, except that the second fluorinated graphite prepared in Example 12B (the $(CF_{1.15})_n$ having a particle diameter $D_{50}$ of 20 μm) was used alone as the positive electrode active material. The degree of surface fluorination of the second fluorinated graphite was 1.85.

Comparative Example 7B

A battery of Comparative Example 7B was fabricated in the same manner as in Example 1B, except that the second fluorinated graphite prepared in Example 13B (the $(CF_{1.10})_n$ having a particle diameter $D_{50}$ of 20 μm) was used alone as the positive electrode active material. The degree of surface fluorination of the second fluorinated graphite was 1.85.

Comparative Example 8B

A battery of Comparative Example 8B was fabricated in the same manner as in Example 1B, except that the second fluorinated graphite prepared in Example 14B (the $(CF_{0.90})_n$ having a particle diameter $D_{50}$ of 20 μm) was used alone as the positive electrode active material. The degree of surface fluorination of the second fluorinated graphite was 1.85.

Comparative Example 9B

A battery of Comparative Example 9B was fabricated in the same manner as in Example 1B, except that the second fluorinated graphite prepared in Example 16B (the $(CF_{0.40})_n$ having a particle diameter $D_{50}$ of 20 μm) was used alone as the positive electrode active material. The degree of surface fluorination of the second fluorinated graphite was 1.85.

Example 18C

A battery was fabricated in the same manner as in Example 1C, except that the first fluorinated graphite having an average particle diameter $D_{50}$ of 0.2 μm prepared in Example 1C was used alone as the positive electrode active material, without using the second fluorinated graphite in the positive electrode active material.

Example 19C

A battery was fabricated in the same manner as in Example 1C, except that the first fluorinated graphite having an average particle diameter $D_{50}$ of 0.5 μm prepared in Example 2C was used alone as the positive electrode active material, without using the second fluorinated graphite in the positive electrode active material.

Example 20C

A battery was fabricated in the same manner as in Example 10, except that the first fluorinated graphite having an average particle diameter $D_{50}$ of 1 μm prepared in Example 3C was used alone as the positive electrode active material, without using the second fluorinated graphite in the positive electrode active material.

Example 21C

A battery was fabricated in the same manner as in Example 10, except that the first fluorinated graphite having an average particle diameter $D_{50}$ of 3 μm prepared in Example 4C was used alone as the positive electrode active material, without using the second fluorinated graphite in the positive electrode active material.

Example 22C

A battery was fabricated in the same manner as in Example 10, except that the first fluorinated graphite having an average particle diameter $D_{50}$ of 7 μm prepared in Example 5C was used alone as the positive electrode active material, without using the second fluorinated graphite in the positive electrode active material.

Comparative Example 1C

A battery was fabricated in the same manner as in Example 1C, except that the second fluorinated graphite having an average particle diameter $D_{50}$ of 10 μm prepared in Example 6C was used alone as the positive electrode active material, without using the first fluorinated graphite in the positive electrode active material. The degree of surface fluorination of the second fluorinated graphite was 1.85.

Comparative Example 2C

A battery was fabricated in the same manner as in Example 1C, except that the second fluorinated graphite having an average particle diameter $D_{50}$ of 13 μm prepared in Example 3C was used alone as the positive electrode active material, without using the first fluorinated graphite in the positive electrode active material. The degree of surface fluorination of the second fluorinated graphite was 1.85.

Comparative Example 3C

A battery was fabricated in the same manner as in Example 1C, except that the second fluorinated graphite having an average particle diameter $D_{50}$ of 30 μm prepared in Example 7C was used alone as the positive electrode active material, without using the first fluorinated graphite in the positive electrode active material. The degree of surface fluorination of the second fluorinated graphite was 1.88.

The physical property values of the fluorinated graphites used in Examples 1A to 17A and Comparative Examples 1A to 2A are shown in Table 1. Here, with regard to Comparative Example 1A, the physical property values of the second fluorinated graphites are shown.

The physical property values of the fluorinated graphites used in Examples 1B to 16B and Comparative Examples 1B to 9B are shown in Table 2. Here, with regard to Comparative Examples 1B to 4B and 6B to 9B, the physical property values of the second fluorinated graphites are shown.

The physical property values of the fluorinated graphites used in Examples 1C to 22C and Comparative Examples 1C to 3C are shown in Tables 3 and 5. The particle sizes $D_{50}$ of the first and second fluorinated graphites and the mixing ratio therebetween by weight in Examples 1C to 22C and Comparative Examples 1C to 3C are shown in Tables 4 and 6.

Here, with regard to Comparative Examples 1C to 3C, the physical property values of the second fluorinated graphites are shown.

[Evaluation]

(Open Circuit Voltage (OCV) and Internal Resistance of Battery)

The internal resistance (the impedance at 1 kHz) of the batteries of Examples 1A to 17A, 1B to 16B, and 10 to 22C, and Comparative Examples 1A to 2A, 1B to 9B, and 10 to 3C obtained in the manner as described above were measured. The results are shown in Tables 7, 8, 9 and 10.

The OCV of the battery was measured with a DC voltage meter. The internal resistance of the battery was measured by an AC impedance method. In the AC impedance measurement, a resistance meter MODEL 3566 available from Tsuruga Electric Corporation was used to measure an impedance at 1 kHz by an AC 4-terminal method. The OCV and internal resistance of each battery were each determined as an average of five measured batteries. The results are shown in Tables 7 to 10.

(Low-Temperature Pulse Discharge Characteristics)

After the measurement of internal resistance, the low-temperature pulse discharge characteristics were evaluated as follows.

With regard to Examples 1A to 17A, Comparative Examples 1A to 2A, Examples 1B to 16B, and Comparative Examples 1B to 9B, a cycle in which a discharge at 10 mA for 100 msec was performed once per minute was repeated for 300 hours at −40° C. The lowest voltage reached in the pulse discharge for 300 hours was defined as a pulse discharge voltage of the battery. The batteries of Examples and Comparative Examples, five from each, were discharged, and the five measured values were averaged to obtain a pulse discharge in each Example and Comparative Example.

With regard to Examples 10 to 22C and Comparative Examples 10 to 3C, an evaluation was performed in the same manner as for Examples A and B, except that a cycle in which a discharge at 10 mA for 20 msec was performed once per minute was repeated for 300 hours at −40° C. The results are shown in Tables 7 to 10.

(High-Temperature Storage Characteristics)

The high-temperature storage characteristics were evaluated as follows.

With regard to Examples 1A to 17A, Comparative Examples 1A to 2A, Examples 1B to 16B, and Comparative Examples 1B to 9B, a battery was stored for 10 days in a 120° C. constant temperature bath, and the internal resistance (the impedance at 1 kHz) of the battery after storage was measured. The batteries of Examples and Comparative Examples, five from each, were subjected to a high-temperature storage test, and the five measured values were averaged to obtain an internal resistance in each Example and Comparative Example.

With regard to Examples 10 to 22C and Comparative Examples 10 to 3C, the evaluation was performed in the same manner as in Examples A and B, except that a 125° C. constant temperature bath was used. The results are shown in Tables 7 to 10.

(Relationship Between Utilization Rate of Fluorinated Graphite and Voltage)

Figure 2:
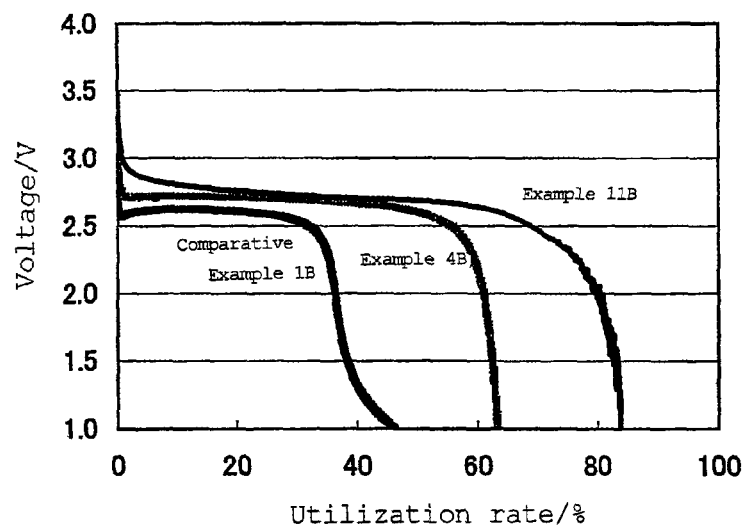
FIG. 2 A graph showing a relationship between the utilization rate of the fluorinated graphite and the voltage when the batteries of Examples 4B and 11B and Comparative Example 1B are discharged at a current of 500 μA at 20° C.

The batteries of Example 4B, Example 11B and Comparative Example 1B were discharged continuously at a current of 500 μA in a 20° C. environment, to compare the discharge characteristics among these. FIG. 2 is a graph showing a relationship between the utilization rate of fluorinated graphite and the voltage.

TABLE 1

|  | Ratio ([F]/[C]) | C1s (eV) | F1s (eV) | O1s (eV) | Value x in $(CF_x)_n$ | Particle diameter $D_{50}$ (μm) | Total pore volume (cm$^3$/g) |
|---|---|---|---|---|---|---|---|
| Ex. 1A | 1.79 | 290.0 | 688.5 | ND | 1.15 | 20 | 0.04 |
| Ex. 2A | 1.70 | 289.5 | 688.0 | ND | 1.15 | 20 | 0.04 |
| Ex. 3A | 1.30 | 289.0 | 687.5 | ND | 1.15 | 20 | 0.04 |
| Ex. 4A | 1.10 | 288.0 | 686.5 | ND | 1.09 | 20 | 0.04 |
| Ex. 5A | 1.00 | 287.5 | 686.0 | ND | 0.90 | 20 | 0.04 |
| Ex. 6A | 1.30 | 289.0 | 687.5 | ND | 1.20 | 20 | 0.04 |
| Ex. 7A | 1.30 | 289.0 | 687.5 | ND | 1.10 | 20 | 0.04 |
| Ex. 8A | 1.30 | 289.0 | 687.5 | ND | 0.80 | 20 | 0.04 |
| Ex. 9A | 1.30 | 289.0 | 687.5 | ND | 0.50 | 20 | 0.04 |
| Ex. 10A | 1.30 | 289.0 | 687.5 | ND | 0.40 | 20 | 0.04 |
| Ex. 11A | 1.30 | 289.0 | 687.5 | ND | 0.30 | 20 | 0.04 |
| Ex. 12A | 1.30 | 289.0 | 687.5 | ND | 1.10 | 15 | 0.04 |
| Ex. 13A | 1.30 | 289.0 | 687.5 | ND | 1.10 | 10 | 0.05 |
| Ex. 14A | 1.30 | 289.0 | 687.5 | ND | 1.10 | 3 | 0.14 |
| Ex. 15A | 1.30 | 289.0 | 687.5 | ND | 1.10 | 1 | 0.20 |
| Ex. 16A | 1.30 | 289.0 | 687.5 | ND | 1.10 | 0.5 | 0.44 |
| Ex. 17A | 1.30 | 289.0 | 687.5 | ND | 1.10 | 0.1 | 1.00 |
| Com. Ex. 1A | 1.80 | 290.0 | 688.5 | ND | 1.15 | 20 | 0.04 |
| Com. Ex. 2A | 0.90 | 287.0 | 685.0 | ND | 0.76 | 20 | 0.04 |

ND: Not detected

TABLE 2

|  | Ratio ([F]/[C]) | C1s (eV) | F1s (eV) | O1s (eV) | Value x in $(CF_x)_n$ | Particle diameter $D_{50}$ (μm) | Total pore volume (cm$^3$/g) |
|---|---|---|---|---|---|---|---|
| Ex. 1B | 1.70 | 290.0 | 688.5 | 531 | 0.30 | 12 | 0.05 |
| Ex. 2B | 1.50 | 289.0 | 687.5 | 531.5 | 0.30 | 12 | 0.05 |
| Ex. 3B | 1.30 | 288.0 | 686.5 | 531.5 | 0.30 | 12 | 0.05 |
| Ex. 4B | 1.20 | 287.9 | 686.3 | 531.5 | 0.30 | 12 | 0.05 |
| Ex. 5B | 1.50 | 289.7 | 688.3 | 531.5 | 0.30 | 10 | 0.05 |
| Ex. 6B | 1.35 | 289.5 | 688.0 | 532 | 0.30 | 3 | 0.14 |
| Ex. 7B | 1.20 | 289.0 | 687.5 | 532 | 0.30 | 1 | 0.20 |
| Ex. 8B | 1.15 | 288.5 | 687.0 | 533 | 0.30 | 0.5 | 0.44 |
| Ex. 9B | 1.05 | 288.0 | 686.5 | 534 | 0.30 | 0.1 | 1.00 |
| Ex. 10B | 1.00 | 287.9 | 686.3 | 534 | 0.30 | 0.05 | 1.60 |
| Ex. 11B | 1.20 | 289.0 | 687.5 | 532 | 1.20 | 1 | 0.20 |
| Ex. 12B | 1.20 | 289.0 | 687.5 | 532 | 1.15 | 1 | 0.20 |
| Ex. 13B | 1.20 | 289.0 | 687.5 | 532 | 1.10 | 1 | 0.20 |
| Ex. 14B | 1.20 | 289.0 | 687.5 | 532 | 0.90 | 1 | 0.20 |
| Ex. 15B | 1.20 | 289.0 | 687.5 | 532 | 0.50 | 1 | 0.20 |
| Ex. 16B | 1.20 | 289.0 | 687.5 | 532 | 0.40 | 1 | 0.20 |
| Com. Ex. 1B | 1.85 | 290.1 | 688.6 | ND | 0.30 | 20 | 0.04 |
| Com. Ex. 2B | 1.88 | 290.2 | 688.7 | ND | 0.30 | 30 | 0.03 |
| Com. Ex. 3B | 1.90 | 290.2 | 688.7 | ND | 0.30 | 40 | 0.03 |
| Com. Ex. 4B | 1.95 | 290.2 | 688.8 | ND | 0.30 | 45 | 0.02 |
| Com. Ex. 5B | 1.85 | 290.2 | 688.7 | ND | 0.30 | 12 | 0.05 |
| Com. Ex. 6B | 1.85 | 290.2 | 688.7 | ND | 1.15 | 20 | 0.04 |
| Com. Ex. 7B | 1.85 | 290.2 | 688.6 | ND | 1.10 | 20 | 0.04 |
| Com. Ex. 8B | 1.85 | 290.2 | 688.6 | ND | 0.90 | 20 | 0.04 |
| Com. Ex. 9B | 1.85 | 290.1 | 688.5 | ND | 0.40 | 20 | 0.04 |

TABLE 3

|  | Ratio ([F]/[C]) | C1s (eV) | F1s (eV) | O1s (eV) | Value x in $(CF_x)_n$ | Total pore volume (cm$^3$/g) |
|---|---|---|---|---|---|---|
| Ex. 1C | 1.00 | 287.9 | 686.3 | 534 | 1.0 | 0.67 |
| Ex. 2C | 1.05 | 288.0 | 686.5 | 534 | 1.0 | 0.44 |
| Ex. 3C | 1.20 | 289.0 | 687.5 | 532 | 1.0 | 0.20 |
| Ex. 4C | 1.35 | 289.5 | 688.0 | 532 | 1.0 | 0.14 |
| Ex. 5C | 1.40 | 289.8 | 688.2 | 531.5 | 1.0 | 0.07 |
| Ex. 6C | 1.20 | 289.0 | 687.5 | 532 | 1.0 | 0.20 |
| Ex. 7C | 1.20 | 289.0 | 687.5 | 532 | 1.0 | 0.20 |
| Ex. 8C | 1.20 | 289.0 | 687.5 | 532 | 1.0 | 0.20 |
| Ex. 9C | 1.20 | 289.0 | 687.5 | 532 | 1.0 | 0.20 |

TABLE 3-continued

|  | Ratio ([F]/[C]) | C1s (eV) | F1s (eV) | O1s (eV) | Value x in $(CF_x)_n$ | Total pore volume (cm³/g) |
|---|---|---|---|---|---|---|
| Ex. 10C | 1.20 | 289.0 | 687.5 | 532 | 1.0 | 0.20 |
| Ex. 11C | 1.20 | 289.0 | 687.5 | 532 | 1.0 | 0.20 |
| Ex. 12C | 1.20 | 289.0 | 687.5 | 532 | 1.0 | 0.20 |
| Ex. 13C | 1.20 | 289.0 | 687.5 | 532 | 1.0 | 0.20 |

TABLE 4

|  | Particle diameter $D_{50}$ (μm) | | Mixing ratio by weight (wt %) | |
|---|---|---|---|---|
|  | First fluorinated graphite | Second fluorinated graphite | First fluorinated graphite | Second fluorinated graphite |
| Ex. 1C | 0.2 | 13 | 50 | 50 |
| Ex. 2C | 0.5 | 13 | 50 | 50 |
| Ex. 3C | 1 | 13 | 50 | 50 |
| Ex. 4C | 3 | 13 | 50 | 50 |
| Ex. 5C | 7 | 13 | 50 | 50 |
| Ex. 6C | 1 | 10 | 50 | 50 |
| Ex. 7C | 1 | 30 | 50 | 50 |
| Ex. 8C | 1 | 13 | 10 | 90 |
| Ex. 9C | 1 | 13 | 25 | 75 |
| Ex. 10C | 1 | 13 | 40 | 60 |
| Ex. 11C | 1 | 13 | 60 | 40 |
| Ex. 12C | 1 | 13 | 75 | 25 |
| Ex. 13C | 1 | 13 | 90 | 10 |

TABLE 5

|  | Ratio ([F]/[C]) | C1s (eV) | F1s (eV) | O1s (eV) | Value x in $(CF_x)_n$ | Total pore volume (cm³/g) |
|---|---|---|---|---|---|---|
| Ex. 14C | 1.05 | 288.0 | 686.5 | 534 | 1.0 | 1.00 |
| Ex. 15C | 1.45 | 289.0 | 688.5 | 531 | 1.0 | 0.06 |
| Ex. 16C | 1.20 | 289.0 | 687.5 | 532 | 1.0 | 0.20 |
| Ex. 17C | 1.20 | 289.0 | 687.5 | 532 | 1.0 | 0.20 |
| Ex. 18C | 1.00 | 287.9 | 686.3 | 534 | 1.0 | 0.67 |
| Ex. 19C | 1.05 | 288.0 | 686.5 | 534 | 1.0 | 0.44 |
| Ex. 20C | 1.20 | 289.0 | 687.5 | 532 | 1.0 | 0.20 |
| Ex. 21C | 1.35 | 289.5 | 688.0 | 532 | 1.0 | 0.14 |
| Ex. 22C | 1.40 | 289.8 | 688.2 | 531.5 | 1.0 | 0.07 |
| Com. Ex. 1C | 1.85 | — | — | — | — | — |
| Com. Ex. 2C | 1.85 | — | — | — | — | — |
| Com. Ex. 3C | 1.88 | — | — | — | — | — |

TABLE 6

|  | Particle diameter $D_{50}$ (μm) | | Mixing ratio by weight (wt %) | |
|---|---|---|---|---|
|  | First fluorinated graphite | Second fluorinated graphite | First fluorinated graphite | Second fluorinated graphite |
| Ex. 14C | 0.1 | 13 | 50 | 50 |
| Ex. 15C | 9 | 13 | 50 | 50 |
| Ex. 16C | 1 | 5 | 50 | 50 |
| Ex. 17C | 1 | 40 | 50 | 50 |
| Ex. 18C | 0.2 | — | 100 | 0 |
| Ex. 19C | 0.5 | — | 100 | 0 |
| Ex. 20C | 1 | — | 100 | 0 |
| Ex. 21C | 3 | — | 100 | 0 |
| Ex. 22C | 7 | — | 100 | 0 |
| Com. Ex. 1C | — | 10 | 0 | 100 |
| Com. Ex. 2C | — | 13 | 0 | 100 |
| Com. Ex. 3C | — | 30 | 0 | 100 |

TABLE 7

|  | Pulse discharge voltage (V) | Internal resistance upon fabrication (Ω) | Internal resistance after storage (Ω) | Discharge capacity (mAh/g) | OCV of battery (V) |
|---|---|---|---|---|---|
| Ex. 1A | 1.77 | 9.8 | 18.1 | 783 | 3.41 |
| Ex. 2A | 1.80 | 9.5 | 17.9 | 784 | 3.43 |
| Ex. 3A | 1.82 | 9.2 | 18.3 | 781 | 3.53 |
| Ex. 4A | 1.80 | 9.1 | 18.2 | 766 | 3.59 |
| Ex. 5A | 1.77 | 9.4 | 17.8 | 703 | 3.63 |
| Ex. 6A | 1.77 | 9.4 | 17.9 | 795 | 3.53 |
| Ex. 7A | 1.85 | 8.6 | 17.5 | 761 | 3.53 |
| Ex. 8A | 1.86 | 8.4 | 17.3 | 661 | 3.53 |
| Ex. 9A | 1.87 | 8.2 | 17.0 | 548 | 3.53 |
| Ex. 10A | 1.81 | 8.6 | 17.4 | 472 | 3.53 |
| Ex. 11A | 1.77 | 17.3 | 90.5 | 405 | 3.53 |
| Ex. 12A | 1.85 | 8.5 | 17.3 | 763 | 3.53 |
| Ex. 13A | 1.90 | 8.6 | 17.3 | 765 | 3.53 |
| Ex. 14A | 1.91 | 8.4 | 17.3 | 762 | 3.53 |
| Ex. 15A | 1.93 | 8.0 | 17.0 | 763 | 3.53 |
| Ex. 16A | 1.94 | 9.0 | 18.0 | 764 | 3.53 |
| Ex. 17A | 1.93 | 9.3 | 18.2 | 765 | 3.53 |
| Com. Ex. 1A | 1.69 | 10.7 | 18.8 | 783 | 3.42 |
| Com. Ex. 2A | 1.70 | 11.2 | 19.3 | 644 | 3.43 |

TABLE 8

|  | Pulse discharge voltage (V) | Internal resistance upon fabrication (Ω) | Internal resistance after storage (Ω) | Discharge capacity (mAh/g) | OCV of battery (V) |
|---|---|---|---|---|---|
| Ex. 1B | 1.75 | 9.9 | 18.2 | 408 | 3.43 |
| Ex. 2B | 1.76 | 9.5 | 17.6 | 413 | 3.48 |
| Ex. 3B | 1.78 | 9.2 | 18.4 | 410 | 3.53 |
| Ex. 4B | 1.80 | 10.6 | 35.2 | 411 | 3.55 |
| Ex. 5B | 1.77 | 9.6 | 17.9 | 404 | 3.48 |
| Ex. 6B | 1.82 | 9.5 | 18.0 | 409 | 3.50 |
| Ex. 7B | 1.85 | 9.1 | 18.1 | 413 | 3.55 |
| Ex. 8B | 1.86 | 9.0 | 18.2 | 418 | 3.57 |
| Ex. 9B | 1.88 | 9.4 | 18.4 | 422 | 3.60 |
| Ex. 10B | 1.89 | 11.3 | 68.0 | 431 | 3.63 |
| Ex. 11B | 1.77 | 9.8 | 17.1 | 795 | 3.55 |
| Ex. 12B | 1.82 | 9.6 | 17.4 | 783 | 3.55 |
| Ex. 13B | 1.82 | 9.5 | 17.5 | 762 | 3.55 |
| Ex. 14B | 1.83 | 9.5 | 17.9 | 703 | 3.55 |
| Ex. 15B | 1.83 | 9.4 | 18.2 | 548 | 3.55 |
| Ex. 16B | 1.84 | 9.2 | 18.3 | 520 | 3.55 |
| Com. Ex. 1B | 1.69 | 10.7 | 18.5 | 402 | 3.40 |
| Com. Ex. 2B | 1.68 | 10.9 | 18.8 | 400 | 3.40 |
| Com. Ex. 3B | 1.67 | 11.0 | 18.9 | 398 | 3.40 |
| Com. Ex. 4B | 1.67 | 11.2 | 19.2 | 395 | 3.40 |
| Com. Ex. 5B | 1.69 | 10.3 | 19.0 | 401 | 3.40 |
| Com. Ex. 6B | 1.67 | 10.8 | 18.7 | 765 | 3.40 |
| Com. Ex. 7B | 1.67 | 11.0 | 18.9 | 752 | 3.40 |
| Com. Ex. 8B | 1.68 | 11.1 | 19.1 | 689 | 3.40 |
| Com. Ex. 9B | 1.69 | 10.9 | 19.3 | 461 | 3.40 |

TABLE 9

|  | Pulse discharge voltage (V) | Internal resistance upon fabrication (Ω) | Internal resistance after storage (Ω) | Discharge capacity (mAh/g) | OCV of battery (V) |
| --- | --- | --- | --- | --- | --- |
| Ex. 1C | 1.96 | 9.7 | 33.4 | 735 | 3.59 |
| Ex. 2C | 1.93 | 9.5 | 32.2 | 736 | 3.55 |
| Ex. 3C | 1.91 | 9.2 | 29.5 | 734 | 3.50 |
| Ex. 4C | 1.85 | 9.1 | 29.1 | 737 | 3.48 |
| Ex. 5C | 1.79 | 9.4 | 28.2 | 735 | 3.45 |
| Ex. 6C | 1.92 | 9.4 | 29.7 | 733 | 3.53 |
| Ex. 3C | 1.91 | 9.2 | 29.5 | 736 | 3.50 |
| Ex. 7C | 1.85 | 10.1 | 27.6 | 737 | 3.49 |
| Ex. 8C | 1.79 | 9.7 | 26.4 | 736 | 3.43 |
| Ex. 9C | 1.87 | 9.6 | 27.9 | 734 | 3.45 |
| Ex. 10C | 1.89 | 9.4 | 28.6 | 733 | 3.47 |
| Ex. 3C | 1.91 | 9.2 | 29.5 | 735 | 3.50 |
| Ex. 11C | 1.92 | 9.4 | 30.4 | 736 | 3.51 |
| Ex. 12C | 1.93 | 9.7 | 31.3 | 736 | 3.53 |
| Ex. 13C | 1.94 | 9.9 | 40.1 | 735 | 3.54 |

TABLE 10

|  | Pulse discharge voltage (V) | Internal resistance upon fabrication (Ω) | Internal resistance after storage (Ω) | Discharge capacity (mAh/g) | OCV of battery (V) |
| --- | --- | --- | --- | --- | --- |
| Ex. 14C | 1.96 | 10.1 | 49.3 | 736 | 3.60 |
| Ex. 15C | 1.71 | 9.9 | 26.4 | 732 | 3.41 |
| Ex. 16C | 1.90 | 10.7 | 52.9 | 733 | 3.51 |
| Ex. 17C | 1.77 | 10.1 | 27.0 | 735 | 3.46 |
| Ex. 18C | 1.99 | 10.9 | 71.2 | 736 | 3.63 |
| Ex. 19C | 1.98 | 10.8 | 63.3 | 734 | 3.60 |
| Ex. 20C | 1.95 | 10.3 | 59.1 | 733 | 3.55 |
| Ex. 21C | 1.87 | 10.6 | 31.4 | 734 | 3.50 |
| Ex. 22C | 1.80 | 10.4 | 29.7 | 733 | 3.46 |
| Com. Ex. 1C | 1.72 | 10.5 | 27.0 | 736 | 3.41 |
| Com. Ex. 2C | 1.71 | 9.8 | 26.2 | 735 | 3.40 |
| Com. Ex. 3C | 1.70 | 10.2 | 26.1 | 735 | 3.38 |

The fluorinated graphites used in the batteries of Examples 1A to 5A were prepared by irradiating the fluorinated graphite used in the battery of Comparative Example 1A with ultraviolet rays, to decrease the degree of surface fluorination. Comparison among these batteries with regard to the discharge characteristics shows that the batteries of Examples 1A to 5A using a fluorinated graphite having a degree of surface fluorination of less than 1.8 exhibited a higher pulse discharge voltage than the battery of Comparative Example 1A.

Not only the degree of surface fluorination but also the degree of fluorination (i.e., the value x in $(CF_x)_n$) of the fluorinated graphite used in the battery of Example 5A were decreased. In the battery of Example 5A, the discharge capacity was decreased, but the pulse discharge voltage was improved.

The fluorinated graphite used in the battery of Comparative Example 2A was prepared by irradiating the fluorinated graphite used in the battery of Example 1A with ultraviolet rays for a longer period of time, to decrease the degree of surface fluorination to be 0.9. In the battery of Comparative Example 2A, the pulse discharge voltage was not improved, and the discharge capacity was significantly decreased due to the influence of the value x in the fluorinated graphite that was reduced to be 0.76. The value x was significantly reduced presumably because the reaction to cause a carbon-fluorine bond in the fluorinated graphite to rupture proceeded not only around the surface but also into the interior of the fluorinated graphite.

The above results indicate that by adjusting the degree of surface fluorination of the fluorinated graphite within the range of 1.0 or more and less than 1.8, the low-temperature pulse discharge characteristics can be improved. Further, the batteries of Examples 2A, 3A and 4A using a fluorinated graphite having a degree of surface fluorination of 1.7, 1.3 or 1.1 exhibited further improved pulse discharge characteristics. This indicates that a more preferred range of the degree of surface fluorination of the fluorinated graphite is 1.1 to 1.7.

The fluorinated graphites used in the batteries of Examples 3A and 6A to 11A had the same degree of surface fluorination of 1.3 but had different values x within the range of 0.30 to 1.20. The batteries of Examples 3A and Examples 7A to 10A exhibited a higher pulse discharge voltage than the battery of Example 6A using a fluorinated graphite where the value x was 1.20. This is presumably resulted from the influence of the property of fluorinated graphite, the property being such that the discharge voltage becomes low as the value x becomes high.

Likewise, the batteries of Examples 3A and 7A to 10A exhibited a higher pulse discharge voltage than the battery of Example 11A using a fluorinated graphite where the value x was 0.3. It should be noted that in the battery of Example 11A, the voltage during the pulse discharge reached the lowest at the beginning of discharge. This is presumably because fluorine atoms that are easily liberated are present on the surface of the fluorinated graphite where the value x is small, and the fluorine atoms leaches out into the non-aqueous electrolyte and react with lithium at the negative electrode, forming a resistance coating film on the surface of the lithium at the negative electrode, and causing the internal resistance of the battery to increase.

The foregoing results indicate that the pulse discharge voltage can be remarkably improved by using a fluorinated graphite where the value x is within the range of 0.40 to 1.15 (i.e., $(CF_x)_n$ where $0.40 \leq x \leq 1.15$) such as the fluorinated graphites used in the batteries of Examples 3A and 7A to 10A. Further, the batteries of Examples 7A to 9A using a fluorinated graphite where the value x was 0.5 to 1.10 exhibited further higher pulse discharge voltages. The pulse discharge voltage was improved presumably because not a little amount of $(C_2F)_n$ capable of providing a high discharge voltage was contained in a fluorinated graphite where the value x was 0.5 or more. Accordingly, the suitable range of the value x in the fluorinated graphite is 0.5 to 1.1. It should be noted that the similar results were obtained when the degree of surface fluorination was 1.7 or 1.0, and the value x was varied within the range of 0.3 to 1.20.

In the batteries of Examples 12A to 17A, a fluorinated graphite whose degree of surface fluorination had been decreased by wet-pulverization was used. In the interior of the fluorinated graphite, many unreacted carbon portions that remained unfluorinated were present. The degree of surface fluorination was decreased presumably because these unreacted carbon portions that remained unfluorinated were exposed on the surface of the fluorinated graphite by the pulverization.

When the degree of surface fluorination was decreased by applying an external energy such as ultraviolet rays to cause a carbon-fluorine bond on the surface to rupture, the value x was decreased because the carbon-fluorine bond in the interior also ruptured by such an excessive application of energy.

Various conditions for the pulverization of fluorinated graphite were examined; however, it was impossible to decrease the degree of surface fluorination to be less than 1.0, and the decrease of the value x was small. As shown above, pulverization is a suitable method for decreasing the degree of surface fluorination in that pulverization can prevent the decrease of the value x associated with the decrease of the degree of surface fluorination.

In the batteries of Examples 12A to 17A, a fluorinated graphite whose particle size had been adjusted by pulverization was used. Among these batteries, the battery using a fluorinated graphite having a smaller particle size exhibited a higher pulse discharge voltage. However, the battery of Example 12A including a fluorinated graphite having a particle diameter $D_{50}$ of 15 μm and the battery of Example 7A using a fluorinated graphite having a particle diameter $D_{50}$ of 20 μm exhibited the same pulse discharge voltage. In short, there was no difference in the pulse discharge voltage between when the particle diameter $D_{50}$ of the fluorinated graphite was 15 μm and when it was 20 μm. When the particle diameter $D_{50}$ was adjusted to be 10 μm as in the fluorinated graphite used in the battery of Example 13A, the pulse discharge voltage was improved. As shown by the pulse discharge voltages of the batteries of Examples 14A to 17A, the pulse discharge voltage became higher with a decrease of the particle diameter $D_{50}$ of the fluorinated graphite within the range of 10 μm or less.

The foregoing results indicate that the low-temperature discharge characteristics can be improved by adjusting the particle diameter $D_{50}$ of the fluorinated graphite to be within the range of 0.1 to 10 μm. Further, since the pulse discharge voltages of the batteries of Examples 14A to 17A were more improved, it is suitable to adjust the particle diameter $D_{50}$ of the fluorinated graphite to be within the range of 0.1 to 3 μm.

The total pore volume of the fluorinated graphite used in each of the batteries of Examples 13A to 17A was within the range of 0.05 to 1.0 $cm^3/g$. The fact that pulverization increases the pore volume of the fluorinated graphite has been found by the present inventors.

In terms of the pore distribution, in the range of 2 to 8 nm, which is equivalent to the size of crystallite of fluorinated graphite, the pore volume peaks were peculiarly increased. This is presumably because cracks occurred in the particle of fluorinated graphite as a result of pulverization, and, in particular, the gaps between the crystallites were increased.

An increase of the gaps in the fluorinated graphite particle as described above allows the positive electrode to be easily impregnated with non-aqueous electrolyte. Further, since the interior of the fluorinated graphite particle is not electrically conductive, the interior of the fluorinated graphite particle is not involved in the discharge reaction at the beginning of discharge; however, the reaction of the fluorinated graphite with lithium proceeds as the discharge proceeds, which improves the conductivity of the fluorinated graphite particle. Presumably, accordingly, the interior of the fluorinated graphite particle gradually becomes involved in the discharge reaction. Another possible reason why the pulse discharge voltages of the batteries of Examples 13A to 17A were high was the contribution of an increase in the pore volume.

When a fluorinated graphite having a total pore volume of more than 1.0 $cm^3/g$ was used, a phenomenon was observed in which the positive electrode considerably swelled as a result of impregnation with non-aqueous electrolyte, and the electrode was broken.

Therefore, in order to improve the large-current pulse discharge characteristics in a low temperature environment, it is suitable to adjust the total pore volume of the fluorinated graphite to be within the range of 0.05 to 1.0 $cm^3/g$.

The fluorinated graphites used in the batteries of Comparative Examples 1B to 4B each had a C1s peak attributed to a C—F bond in the region of more than 290 eV and had an F1s peak attributed to a C—F bond in the region of more than 688.5 eV. In short, the binding strength of the C—F bond on the surface of the fluorinated graphite was high.

The first fluorinated graphites used in the batteries of Examples 1B to 4B were prepared by dry-pulverizing the fluorinated graphites used in the batteries of Comparative Examples 1B to 4B, respectively. The C1s peak attributed to a C—F bond of the first fluorinated graphite in each Example was in the region of 290 eV or less, and the F1s peak attributed to a C—F bond was in the region of 688.5 eV or less.

The batteries of Examples 1B to 4B exhibited higher pulse discharge voltages than the batteries of Comparative Examples 1B to 4B. Among the batteries of Examples 1B to 4B, the weaker the binding strength of the C—F bond on the surface of the fluorinated graphite was, the higher the pulse discharge voltage tended to be. The foregoing results indicate that the effect of ameliorating the discharge characteristics can be increased by weakening the binding strength of the C—F bond on the surface of the fluorinated graphite. Therefore, in order to ameliorate the discharge characteristics of the battery, it is considered preferable to use a fluorinated graphite having a C1s peak attributed to a C—F bond in the region of 290 eV or less and an F1s peak attributed to a C—F bond in the region of more than 688.5 eV.

However, in the battery of Example 4B using a fluorinated graphite having a C1s peak attributed to a C—F bond in the region of less than 288 eV and an F1s peak attributed to a C—F bond in the region of less than 686.5 eV, the internal resistance after storage at high temperature was significantly increased.

In order to clarify the reason why there was a difference in the increase in the internal resistance as described above, the following analysis was carried out.

After stored at high temperature, the batteries of Examples 1B to 4B were dismantled. The lithium in the negative electrode was washed with dimethyl carbonate (DMC), and the surface thereof was analyzed along the depth direction using XPS.

The results showed that in all of the batteries of Examples 1B to 4B, a Li—F coating film was formed on the surface of the lithium. In the batteries of Examples 1B to 3B, the Li—F coating film was formed to a depth of about 200 nm from the surface. On the other hand, in the battery of Example 4B, the Li—F coating film was formed to a depth of about 300 nm from the surface. This is presumably because a larger amount of fluorine ions was liberated from the fluorinated graphite into the electrolyte during storage at high temperature in the battery of Example 4B than in the batteries of the other Examples.

Further, with respect to the batteries of Examples 1B to 4B after storage at high temperature, the generated gas was analyzed using gas chromatography.

The results showed that the amounts of hydrogen gas generated in the batteries of Examples 1B to 3B were 0.1 mL or less; and the amount of hydrogen gas generated in the battery of Example 4B was 0.5 mL, which was larger than those in the batteries of Examples 1B to 3B. Although the mechanism that causes the amount of hydrogen gas generated to increase during storage at high temperature is unidentified, it is presumable that hydrogen gas is generated in association with the Li—F coating film forming reaction.

Based on the foregoing, it can be concluded that, in the case of using a fluorinated graphite having a C1s peak attributed to a C—F bond in the region of less than 288 eV and an F1s peak attributed to a C—F bond in the region of less than 686.5 eV, because of its weak binding strength of the C—F bond on the surface, the fluorine ions are readily liberated inside the battery, and as a result, the storage characteristics are slightly deteriorated. Therefore, in order to ameliorate the battery discharge characteristics and prevent the reduction in the storage characteristics, it is more preferable to use a fluorinated graphite having a C1s peak attributed to a C—F bond in the region of 288 to 290 eV and an F1s peak attributed to a C—F bond in the region of 686.5 to 688.5 eV.

In the batteries of Examples 5B to 10B, the first fluorinated graphites with an adjusted particle diameter obtained by pulverizing a second fluorinated graphite having a C1s peak attributed to a C—F bond in the region of more than 290 eV and an F1s peak attributed to a C—F bond in the region of more than 688.5 eV were used.

In the batteries of Examples 5B to 10B, presumably, the C—F bonds with weak binding strength became exposed on the surface of the fluorinated graphite as the fluorinated graphite was pulverized to be a smaller particle diameter. This reduced the binding strength of the C—F bonds on the surface, resulting in high pulse discharge voltages. Presumably, since the fluorinated graphite was dry-pulverized in these Examples, even when the particle diameter $D_{50}$ was decreased, the degree of fluorination was not lowered, and only the binding strength of the C—F bonds on the surface was reduced. In the interior of the second fluorinated graphite, more C—F bonds are present in a transition state, namely, a state before being formed into perfect covalent bonds, than on the surface of the fluorinated graphite. The C1s peak attributed to a C—F bond and the F1s peak attributed to a C—F bond shifted to the lower energy side presumably because the C—F bonds in a transition state were exposed on the surface by pulverizing the second fluorinated graphite.

As describe above, the binding strength of the C—F bond in the fluorinated graphite surface can be controlled by obtaining the fluorinated graphite by pulverization. Therefore, it is preferable to pulverize the second fluorinated graphite having a C1s peak attributed to a C—F bond in the region of more than 290 eV and an F1s peak attributed to a C—F bond in the region of more than 688.5 eV, to give the first fluorinated graphite.

A comparison was made between the fluorinated graphites having the same C—F bond binding strength on the surface and the same degree of fluorination but being different in the particle diameter. The battery of Example 10B exhibited a reduced interface resistance in the positive electrode active material and a higher pulse discharge voltage presumably because the particle diameter $D_{50}$ of the fluorinated graphite was smaller than that in the battery of Example 4B. The battery of Example 10B, however, exhibited a slightly large increase in the internal resistance after storage at high temperature. This is presumably because the fluorinated graphite had a small particle size and thus had a large specific surface area, increasing the amount of fluorine liberated from the fluorinated graphite during storage at high temperature, and increasing the thickness of the Li—F coating film formed on the surface of the lithium at the negative electrode. Based on the foregoing results, a more preferable range of the particle diameter $D_{50}$ of the fluorinated graphite is 0.1 μm or more and 10 μm or less. Based on the result that the batteries of the Examples 6B to 9B exhibited higher pulse discharge voltages, a further preferable range of the particle diameter $D_{50}$ of the fluorinated graphite is 0.1 μm or more and 3 μm or less.

In the batteries of Comparative Examples 6B to 9B, a fluorinated graphite having a C1s peak attributed to a C—F bond in the region of more than 290 eV and an F1s peak attributed to a C—F bond in the region of more than 688.5 eV, and a degree of fluorination of 0.40 to 1.15 was used.

In the batteries of Examples 7B and 11B to 16B, fluorinated graphites having the same C—F bond binding strength on the surface and the same particle diameter $D_{50}$ but being different in the degree of fluorination were used. The battery of Example 11 exhibited a lower pulse discharge voltage than the batteries of Examples 7B and 12B to 16B. This is presumably because the degree of fluorination of the fluorinated graphite was large, and thus the overvoltage was slightly increased.

Among the above fluorinated graphites, the first fluorinated graphites used in the batteries of Examples 12B to 14B and 16B were obtained by dry-pulverizing the fluorinated graphites used in the batteries of Comparative Examples 6B to 9B, respectively. The pulse discharge voltages of the batteries of Examples 12B to 14B and 16B were higher than those of the batteries of corresponding Comparative Examples.

With respect to the discharge capacity per weight of the fluorinated graphite, those of the batteries of Examples 11B to 16B were 500 mAh/g or more, showing that these batteries had high energy densities. Based on the foregoing results, the fluorinated graphite is preferably represented by the formula $(CF_x)_n$, where $0.4 \leq x \leq 1.15$. Based on the result that the discharge capacities of the batteries of Examples 12B to 14B were further increased, it is more preferable that the degree of fluorination satisfies $0.90 \leq x \leq 1.15$.

FIG. 2 is a graph showing a relationship between the utilization rate of the fluorinated graphite used in Examples 4B, 11B and Comparative Example 1B and the voltage when the batteries are discharged at a current of 500 μA at 20° C. In the battery of Comparative Example 1B, a great reduction in voltage was observed upon the start of discharge, and the minimum voltage point appeared at the beginning of discharge.

In the battery of Example 4B, no minimum voltage point appeared at the beginning of discharge, and the discharge voltage was higher than that in Comparative Example 1B.

In the battery of Example 11B, no minimum voltage point appeared at the beginning of discharge, the discharge voltage was higher than that in Example 2B, and the utilization of the fluorinated graphite was higher. The foregoing results indicate that the utilization of the fluorinated graphite is further improved by decreasing the particle diameter $D_{50}$.

Comparison among the batteries of Examples 18C to 22C using the first fluorinated graphite alone as the positive electrode active material showed that the smaller the average particle diameter $D_{50}$ of the fine powder was, the higher the OCV of the battery was. Although the reason for this is unclear, it is presumable that the C—F bonds with weak binding strength in the fluorinated graphite were exposed on the surface of the particle as a result of pulverization, and the OCV of the battery was increased due to the influence of the potential of fluorine. Comparison among these batteries further showed that the smaller the average particle diameter $D_{50}$ of the first fluorinated graphite was, the higher the pulse discharge voltage was; however, the internal resistance after storage at high temperature tended to be slightly increased. The pulse discharge voltage was increased presumably because the particle diameter was decreased, and thus the surface area was increased. The internal resistance after storage at high temperature was increased presumably because the amount of fluorine that was liberated from the fluorinated graphite having a small particle diameter during storage at high temperature was slightly increased.

Further, the batteries of Comparative Examples 1C to 3C using the second fluorinated graphite alone as the positive electrode active material exhibited little change in the pulse discharge voltage and the internal resistance after storage at high temperature. This result reveals that the average particle diameter $D_{50}$ of the course powder has little influence on the battery characteristics.

The positive electrode active materials used in the batteries of Examples 1C to 5C were materials prepared by mixing the first fluorinated graphite used in each of the batteries of Examples 18C to 22C with the second fluorinated graphite having an average particle diameter $D_{50}$ of 13 μm used in the battery of Comparative Example 2C at a ratio of 50:50 by weight. The pulse discharge voltages of these batteries were very close to the pulse discharge voltages of the batteries of Examples 18C to 22C using a fine powder alone.

Figure 3:
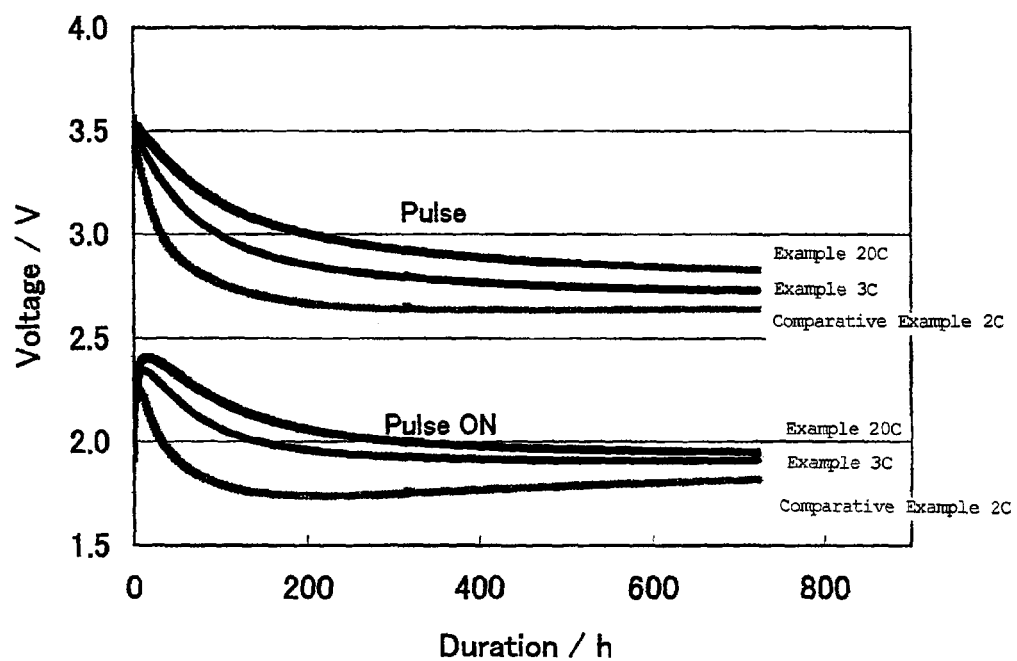
FIG. 3 A graph showing changes over time in battery voltage during ON-time (during discharge) and during OFF-time (during interval of discharge) of a pulse discharge in the batteries of Examples 3C and 20C of the present invention and the conventional battery 2C.

The changes in voltage over time during the above pulse discharge in the batteries of Examples 3C, 20C and Comparative Example 2C are shown in FIG. 3. FIG. 3 is a graph obtained by plotting the battery voltages during pulse OFF-time (during interval of discharge) and the battery voltages during pulse ON-time (during discharge) against the duration. In the battery of Example 20C using a first fluorinated graphite having an average particle diameter $D_{50}$ of 1 μm, the battery voltage during pulse ON-time was slowly decreased upon the start of discharge, and became almost constant after 720 hours. Accordingly, the pulse discharge voltage of the battery of Example 20C is the battery voltage after 720 hours. On the other hand, in the battery of Comparative Example 2C using a second fluorinated graphite having an average particle diameter $D_{50}$ of 13 μm, the battery voltage during pulse ON-time was significantly decreased immediately after the start of discharge, and the battery voltage reached the minimum point after 200 hours, and then showed a slight increase. Accordingly, the pulse discharge voltage of the battery of Comparative Example 2C is the battery voltage after 200 hours. As described above, the reduction in the battery voltage during pulse ON-time from the start of discharge in the battery of Example 20C was smaller than that in the battery of Comparative Example 2C. This result indicates that the reactivity with lithium of the first fluorinated graphite is higher than that of the second fluorinated graphite.

However, in the battery of Example 3C using a coarse powder and a fine powder in combination as the positive electrode active material, likewise in the battery of Example 20C using a fine powder alone as the positive electrode active material, no significant reduction in the discharge voltage was observed at the beginning of discharge as observed in the battery of Comparative Example 2C using a coarse powder alone as the positive electrode active material. This is presumably because the first fluorinated graphite having a high reactivity with lithium preferentially reacted with lithium at the beginning of discharge, and the second fluorinated graphite slowly reacted with lithium to increase its conductivity gradually while the first fluorinated graphite was preferentially reacting with lithium. The batteries of Examples 10, 2C, 4C and 5C exhibited changes in the battery voltage during pulse ON-time similar to those that the battery of Example 3C exhibited.

The foregoing results indicate that the large-current pulse discharge characteristics at low temperature can be further improved by using the first fluorinated graphite exhibiting a high reactivity with lithium immediately after the start of discharge and the second fluorinated graphite whose conductivity increases as the discharge proceeds, in combination as the positive electrode active material.

In addition, the batteries of Examples 10 to 5C exhibited lower internal resistances during storage at high temperature than the batteries of Examples 18C to 22C, showing the batteries of Examples 10 to 5C are superior to the batteries of Examples 18C to 22C in terms of the high-temperature storage characteristics. Although the reason for this is unclear, one possible reason is that the amount of fluorine to be liberated from the active material during storage was decreased as a result of mixing a fine powder and a coarse powder.

Comparison among the batteries of Example 10 to 5C showed that the smaller the average particle diameter $D_{50}$ of the first fluorinated graphite was, the higher the pulse discharge voltage tended to be. This is presumably because the reactivity with lithium of the fluorinated graphite was improved with an increase in the specific surface area of the first fluorinated graphite.

The battery of Example 14C using a first fluorinated graphite having an average particle diameter $D_{50}$ of 0.1 μm exhibited a high pulse discharge, but exhibited a high internal resistance after storage at high temperature. This is presumably because fluorine was liberated from the first fluorinated graphite during the storage, forming an insulating coating film on the surface of the negative electrode. The battery of Example 15C using a first fluorinated graphite having an average particle diameter $D_{50}$ of 9 μm exhibited a low pulse discharge voltage. This is presumably because the first fluorinated graphite had a small surface area and a low reactivity with lithium. Based on the foregoing, the average particle diameter $D_{50}$ of the first fluorinated graphite is preferably 0.2 μm or more and 7 μm or less in view of ameliorating the pulse discharge characteristics in a low temperature environment without sacrificing the high-temperature storage characteristics.

The positive electrode active materials used in the batteries of Examples 3C, 6C and 7C were mixed powders prepared by mixing the first fluorinated graphite having an average particle diameter $D_{50}$ of 1 μm used in the battery of Example 20C with the second fluorinated graphite used in each of the batteries of Comparative Example 10 to 3C at a mixing ratio of 50:50 by weight. The batteries of Examples 3C, 6C and 7C, because of the addition of the first fluorinated graphite in the positive electrode active material, exhibited higher pulse discharge voltages than the batteries of Comparative Examples 10 to 3C using the second fluorinated graphite alone as the positive electrode active material. Comparison among the batteries of Examples 3C, 6C and 7C indicates that when the same fine powder is used, the pulse discharge voltage tends to increase as the particle size of the second fluorinated graphite becomes smaller.

The battery of Example 16C using a second fluorinated graphite having an average particle diameter $D_{50}$ of in combination with a first fluorinated graphite having an average particle diameter $D_{50}$ of 1 μm exhibited a high pulse discharge voltage but exhibited a high internal resistance after storage at high temperature, showing similar level of discharge characteristics to that of the battery using the first fluorinated graphite alone. The battery of Example 17C using a second fluorinated graphite having an average particle diameter $D_{50}$ of 40 μm in combination with a first fluorinated graphite having an average particle diameter $D_{50}$ of 1 μm exhibited a low pulse discharge voltage. This is presumably because, since the surface area of the second fluorinated graphite was very small, the reaction of the second fluorinated graphite with lithium hardly proceeded while the first fluorinated graphite was reacting preferentially with lithium, and the conductivity of the second fluorinated graphite failed to increase. Based on the foregoing, the average particle diameter $D_{50}$ of the second fluorinated graphite is preferably 10 μm or more and 30 μm or less in view of ameliorating the pulse discharge characteristics without sacrificing the high-temperature storage characteristics.

In the batteries of Example 3C and 8C to 13C, a positive electrode active material prepared by mixing a first fluorinated graphite having an average particle diameter $D_{50}$ of 1 μm with a second fluorinated graphite having an average particle diameter $D_{50}$ of 13 μm at a ratio of 10:90 to 90:10 by weight was used. The batteries of Example 3C and 8C to 13C exhibited higher pulse discharge voltages than the battery of Comparative Example 2C using a second fluorinated graphite having an average particle diameter $D_{50}$ of 13 μm alone as the positive electrode active material. Example 3C and 8C to 13C exhibited low internal resistances after storage at high temperature than Example 20C using a first fluorinated graphite having an average particle diameter $D_{50}$ of 1 μm. As shown above, when the mixing ratio of the first fluorinated graphite to the second fluorinated graphite was 10:90 to 90:10 by weight, the discharge characteristics and the high-temperature storage characteristics were ameliorated as compared to when the fine powder or coarse powder of the fluorinated graphite was used alone.

Comparative among the batteries of Examples 3C and 8C to 13C showed that the effect of improving the pulse discharge voltage in the battery of Example 8C was small, and the internal resistance in the battery of Example 13C was comparatively high after storage at high temperature. This indicates that a more preferable mixing ratio of the first fluorinated graphite to the second fluorinated graphite is 25:75 to 75:25 by weight.

The fine powder and the coarse powder used in the positive electrode active materials in the batteries of Examples 1C to 13C were the same as those in the batteries of Examples 18C to 22C and Comparative Examples 1C to 3C. Comparison among the batteries of Examples 18C to 22C and Comparative Examples 1C to 3C with regard to the OCV revealed that the first fluorinated graphite has a higher potential than the second fluorinated graphite. Comparison among the batteries of Examples 3C and 8C to 13C revealed that a higher mixing ratio of the fine powder results in a higher OCV.

One possible reason for the higher pulse discharge voltages of the batteries of Examples 3C, 6C and 7C than those of the batteries of Comparative Examples 1C to 3C is that the OCVs of the batteries of Examples 3C, 6C and 7C are high. Adding a fine powder having a higher potential than the second fluorinated graphite can provide a higher pulse discharge voltage than that when a coarse power is used alone.

Although the fluorinated graphite prepared from a petroleum coke was used in the above Examples, fluorinated graphites prepared from natural graphite, artificial graphite or other carbon materials can be used with the same effect.

INDUSTRIAL APPLICABILITY

The non-aqueous electrolyte battery of the present invention is excellent in large-current discharge characteristics in a low temperature environment, and particularly in pulse discharge characteristics. The non-aqueous electrolyte battery of the present invention is useful, for example, as a main power source for a device for which excellent low-temperature discharge characteristics and long-term reliability are required, such as a vehicle-mounted device represented by a tire pressure monitoring system (TPMS), a utility meter represented by a gas meter, a water meter, etc, and the like.

The invention claimed is:

1. A non-aqueous electrolyte battery comprising:
a positive electrode including a positive electrode active material, said positive electrode active material containing a first fluorinated graphite having a concentration ratio [F]/[C] of fluorine atoms to carbon atoms on the surface of said first fluorinated graphite of from 1.0 to less than 1.8, said first fluorinated graphite has a total pore volume of from 0.05 cm$^3$/g to 1.0 cm$^3$/g;
a negative electrode including a negative electrode active material, said negative electrode active material containing metal lithium or a lithium alloy;
a separator disposed between said positive electrode and said negative electrode; and
a non-aqueous electrolyte.

2. The non-aqueous electrolyte battery in accordance with claim 1, wherein said first fluorinated graphite has a C1s peak attributed to a C—F bond in the region of 290 eV or less and has an F1s peak attributed to a C—F bond in the region of 688.5 eV or less in X-ray photoelectron spectroscopy.

3. The non-aqueous electrolyte battery in accordance with claim 1, wherein said positive electrode active material further contains a second fluorinated graphite having a concentration ratio [F]/[C] of fluorine atoms to carbon atoms on the surface thereof of more than 1.8, and said first fluorinated graphite and said second fluorinated graphite are present in a mixed state.

4. The non-aqueous electrolyte battery in accordance with claim 1, wherein said first fluorinated graphite is obtained by pulverizing a second fluorinated graphite having a concentration ratio [F]/[C] of fluorine atoms to carbon atoms on the surface thereof of more than 1.8.

5. The non-aqueous electrolyte battery in accordance with claim 3, wherein said second fluorinated graphite has a C1s peak attributed to a C—F bond in the region of more than 290 eV and has an F1s peak attributed to a C—F bond in the region of more than 688.5 eV in X-ray photoelectron spectroscopy.

6. The non-aqueous electrolyte battery in accordance with claim 1, wherein said first fluorinated graphite has a particle diameter $D_{50}$ at a volume fraction of 50% in a volume-accumulated particle size distribution of 0.1 to 10 μm.

7. The non-aqueous electrolyte battery in accordance with claim 1, wherein said first fluorinated graphite is represented by the formula (1): $(CF_x)_n$, where $0.4 \leq x \leq 1.15$, and n is an integer of 1 or more.

8. The non-aqueous electrolyte battery in accordance with claim 2, wherein said C1s peak attributed to a C—F bond is in the region of 288 to 290 eV, and said F1s peak attributed to a C—F bond is in the region of 686.5 to 688.5 eV.

9. The non-aqueous electrolyte battery in accordance with claim 2, wherein said first fluorinated graphite further has an O1s peak attributed to a C—O bond in the region of 530 to 534 eV in X-ray photoelectron spectroscopy.

10. The non-aqueous electrolyte battery in accordance with claim 3, wherein said first fluorinated graphite has a particle diameter $D_{50}$ at a volume fraction of 50% in a volume-accumulated particle size distribution of from 0.2 μm to 7 μm.

11. The non-aqueous electrolyte battery in accordance with claim 3, wherein said second fluorinated graphite has a particle diameter $D_{50}$ at a volume fraction of 50% in a volume-accumulated particle size distribution of from 10 μm to 30 μm.

12. The non-aqueous electrolyte battery in accordance with claim 3, wherein a mixing ratio of said first fluorinated graphite to said second fluorinated graphite in said positive electrode is 10:90 to 90:10 by weight.

13. The non-aqueous electrolyte battery in accordance with claim 3, wherein said first fluorinated graphite has a higher power capability than said second fluorinated graphite.

* * * * *